US012641635B2

(12) United States Patent
Gao et al.

(10) Patent No.: US 12,641,635 B2
(45) Date of Patent: May 26, 2026

(54) RANDOM ACCESS METHOD AND DEVICE

(71) Applicant: HUAWEI TECHNOLOGIES CO., LTD., Shenzhen (CN)

(72) Inventors: Kuandong Gao, Chengdu (CN); Mao Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 18/299,949

(22) Filed: Apr. 13, 2023

(65) Prior Publication Data

US 2023/0254891 A1  Aug. 10, 2023

Related U.S. Application Data

(63) Continuation of application No. PCT/CN2020/121706, filed on Oct. 16, 2020.

(51) Int. Cl.

| | |
|---|---|
| *H04W 74/00* | (2009.01) |
| *H04L 1/08* | (2006.01) |
| *H04L 1/1812* | (2023.01) |
| *H04W 74/08* | (2024.01) |
| *H04W 74/0833* | (2024.01) |
| *H04W 74/0836* | (2024.01) |
| *H04W 74/0838* | (2024.01) |

(52) U.S. Cl.
CPC ............. *H04W 74/002* (2013.01); *H04L 1/08* (2013.01); *H04W 74/0833* (2013.01); *H04W 74/0836* (2024.01); *H04W 74/0838* (2024.01)

(58) Field of Classification Search
CPC .. H04W 74/002; H04W 74/0833; H04L 1/819
See application file for complete search history.

(56) References Cited

U.S. PATENT DOCUMENTS

| | | | |
|---|---|---|---|
| 2018/0220450 A1* | 8/2018 | Aiba | H04W 74/004 |
| 2018/0279136 A1 | 9/2018 | Tsai et al. | |
| 2020/0120709 A1 | 4/2020 | Bergquist et al. | |
| 2020/0154472 A1* | 5/2020 | Kato | H04W 74/006 |

(Continued)

FOREIGN PATENT DOCUMENTS

| | | |
|---|---|---|
| CN | 112040558 A | 12/2020 |
| EP | 3855832 A1 | 7/2021 |

(Continued)

OTHER PUBLICATIONS

India Office Action issued in corresponding India Application No. 202327028165, dated Jul. 2, 2024, pp. 1-6.

(Continued)

*Primary Examiner* — Derrick V Rose
(74) *Attorney, Agent, or Firm* — HAUPTMAN HAM, LLP

(57) ABSTRACT

In a random access method, random access preambles are grouped, and an electronic device selects a random access preamble from the grouped random access preambles, and receives an indication of a base station for the electronic device to send a message 3 repeatedly or in a diversity mode, so that the electronic device sends the message 3 repeatedly or in a diversity mode in a random access process. Accordingly, a probability of detecting the message 3 by the base station can be effectively improved, coverage performance of an uplink signal is improved, and/or resources of the base station are less wasted.

20 Claims, 11 Drawing Sheets

(56)                References Cited

U.S. PATENT DOCUMENTS

| | | | | |
|---|---|---|---|---|
| 2021/0068160 | A1* | 3/2021 | Takahashi | H04W 74/006 |
| 2021/0360430 | A1* | 11/2021 | Reial | H04W 56/001 |
| 2024/0172271 | A1* | 5/2024 | Xiong | H04W 72/51 |

FOREIGN PATENT DOCUMENTS

| | | | |
|---|---|---|---|
| WO | 2019082152 | A1 | 5/2019 |
| WO | 2019213978 | A1 | 11/2019 |
| WO | 2020059721 | A1 | 3/2020 |

OTHER PUBLICATIONS

Ericsson Solutions to Coverage Issues for Msg3 Transmissions3GPP TSG-RAN WG2 #102 R2-1807028 25. May 25, 2018,total 4 pages.
3GPP TS 38.331 v16.2.0 3rd Generation Partnership Project; Technical Specification Group Radio Access Network; NR;Radio Resource Control (RRC) protocol specification(Release 16), Sep. 2020,total 921 pages.
3GPP TS 38.321 V16.2.1:"3rd Generation Partnership Project; Technical Specification Group Radio Access Network; NR;Medium Access Control (MAC) protocol specification(Release 16)",Sep. 2020,total 154 pages.
3GPP TS 38.300 V16.3.0 :"3rd Generation Partnership Project; Technical Specification Group Radio Access Network; NR; NR and NG-RAN Overall Description; Stage 2 (Release 16)",Sep. 2020,total 148 pages.
3GPP TS 38.214 V16.3.0:"3rd Generation Partnership Project; Technical Specification Group Radio Access Network; NR;Physical layer procedures for data(Release 16)",Sep. 2020,total 166 pages.
3GPP TS 38.213 V16.3.0:"3rd Generation Partnership Project; Technical Specification Group Radio Access Network; NR; Physical layer procedures for control (Release 16)",Sep. 2020,total 179 pages.
3GPP TS 38.212 V16.3.0 :"3rd Generation Partnership Project; Technical Specification Group Radio Access Network; NR;Multiplexing and channel coding(Release 16)".Sep. 2020,total 152 pages.
3GPP TS 38.211 V16.3.0 (Sep. 2020), 3rd Generation Partnership Project; Technical Specification Group Radio Access Network; NR; Physical channels and modulation(Release 16), 24 pages.
3GPP TS 38.133 V16.5.0:"3rd Generation Partnership Project;Technical Specification Group Radio Access Network; NR;Requirements for support of radio resource management(Release 16)".Sep. 2020,total 1608 pages.
Extended European Search Report issued in corresponding European Application No. 20957299.9, dated Feb. 14, 2024, pp. 1-21.

* cited by examiner

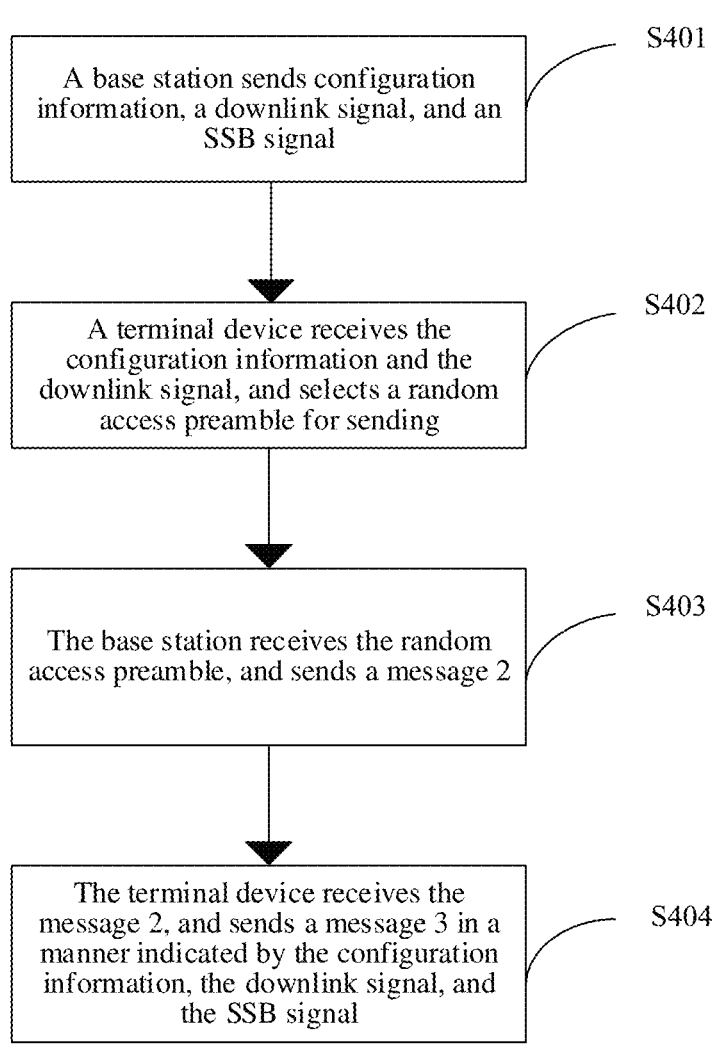

S401

A base station sends configuration information, a downlink signal, and an SSB signal

S402

A terminal device receives the configuration information and the downlink signal, and selects a random access preamble for sending

S403

The base station receives the random access preamble, and sends a message 2

S404

The terminal device receives the message 2, and sends a message 3 in a manner indicated by the configuration information, the downlink signal, and the SSB signal

FIG. 4

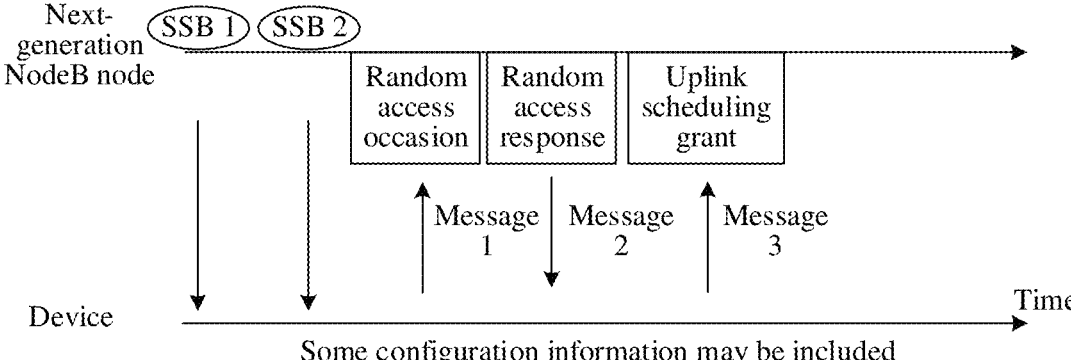

FIG. 5

| Field value/Field length | Meaning |
|---|---|
| Value: K1; Length: F1 | No set used to indicate repeated sending exists |
| Value: K2; Length: F2 | A message 3 is repeatedly sent for N1 times |
| Value: K1; Length: F3 | The message 3 is repeatedly sent for N2 times |

FIG. 6

| Actual measured RSRP > Threshold 1 | No repeated transmission |
|---|---|
| Threshold 2 ≤ Actual measured RSRP < Threshold 1 | A message 3 is repeatedly sent for N1 times |
| Threshold 3 ≤ Actual measured RSRP < Threshold 2 | The message 3 is repeatedly sent for N2 times |

FIG. 7

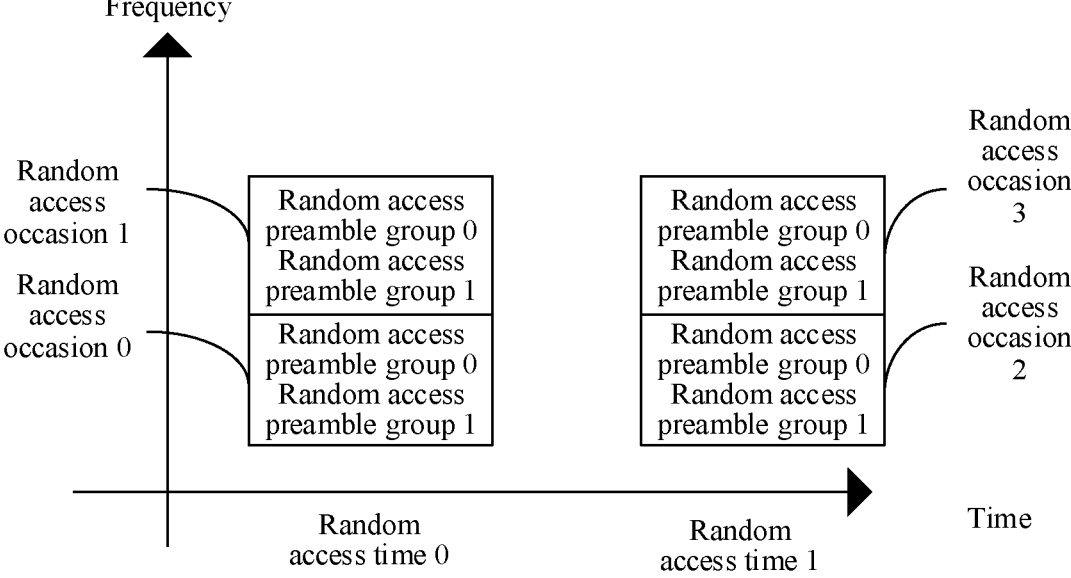

FIG. 8

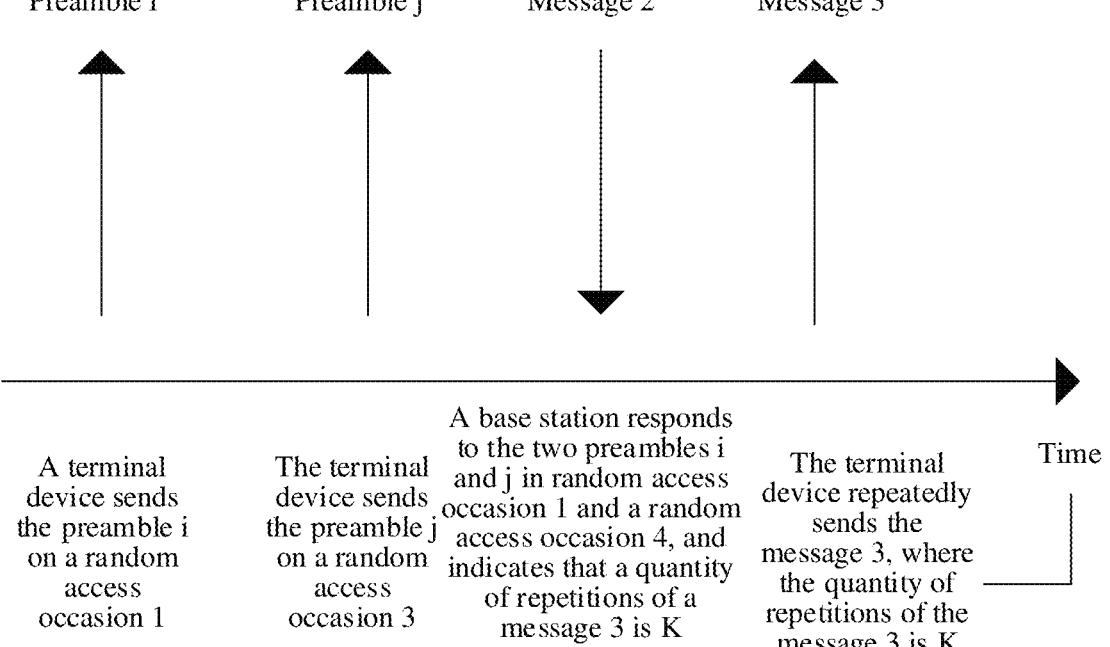

Preamble i          Preamble j          Message 2          Message 3

A terminal
device sends
the preamble i
on a random
access
occasion 1

The terminal
device sends
the preamble j
on a random
access
occasion 3

A base station responds
to the two preambles i
and j in random access
occasion 1 and a random
access occasion 4, and
indicates that a quantity
of repetitions of a
message 3 is K The terminal
device repeatedly
sends the
message 3, where
the quantity of
repetitions of the
message 3 is K Time

FIG. 9

Figure 12:
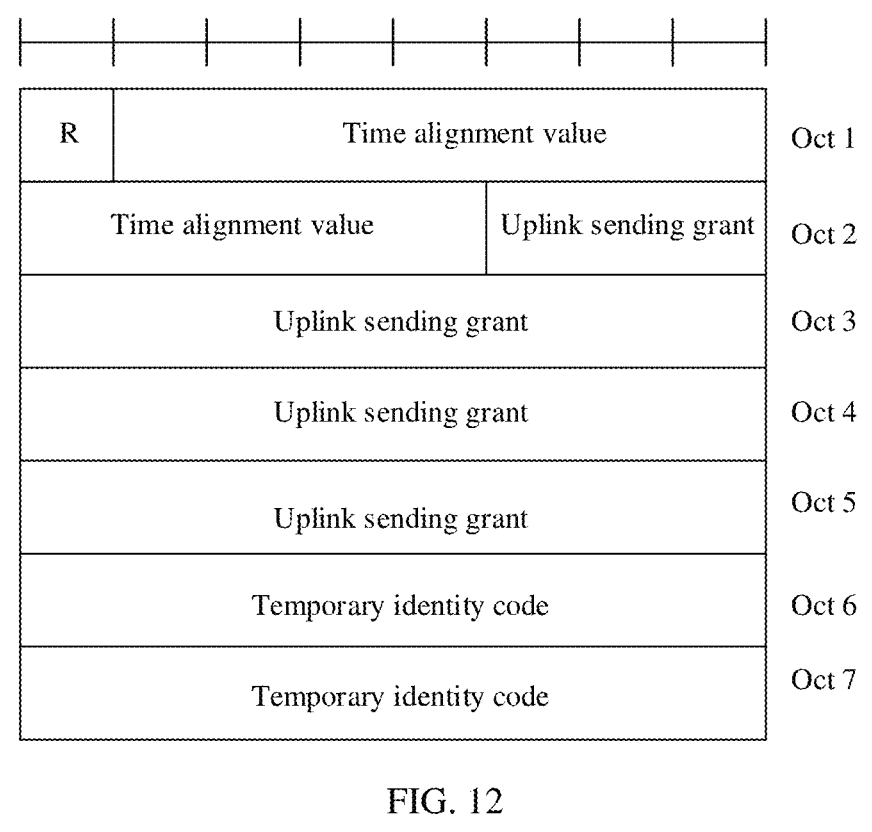

| | |
|---|---|
| R     Time alignment value | Oct 1 |
| Time alignment value     Uplink sending grant | Oct 2 |
| Uplink sending grant | Oct 3 |
| Uplink sending grant | Oct 4 |
| Uplink sending grant | Oct 5 |
| Temporary identity code | Oct 6 |
| Temporary identity code | Oct 7 |

RANDOM ACCESS METHOD AND DEVICE

CROSS-REFERENCE TO RELATED APPLICATIONS

This application is a continuation of International Application No. PCT/CN2020/121706, filed on Oct. 16, 2020. the disclosure of which is hereby incorporated by reference in its entirety.

TECHNICAL FIELD

This application relates to the communication field, and in particular, to a random access method of a terminal device and a base station.

BACKGROUND

After a terminal device implements downlink synchronization with a base station, the terminal device obtains system information required for initiating random access. The terminal device implements uplink synchronization with the base station through a random access process. Random access processes include a contention based random access process and a contention free random access process. Contention based random access is random access performed when the terminal device does not implement uplink synchronization or lose uplink synchronization, and the terminal devices do not coordinate with each other. Contention free random access is random access performed when the terminal devices coordinate to some extent with each other. The contention based random access process is usually divided into four steps, and each step corresponds to one message, including: a message 1, a message 2, a message 3, and a message 4. Because a wireless communication environment is complex, to improve robustness of the random access process, improve coverage performance of an uplink signal, and reduce a delay in a complex environment, the terminal device is required to send a message repeatedly or in a diversity mode.

SUMMARY

An embodiment of this application provides a random access method. A terminal device may send a message 3 repeatedly and/or in a diversity mode, so that coverage performance of an uplink signal is effectively improved, and a delay in a complex environment is reduced.

According to a first aspect, a base station sends at least one of a downlink signal, random access configuration information, and association information between downlink signals and random access preambles. The random access configuration information indicates to divide the random access preambles into N groups of random access preambles, the association information indicates an association between the downlink signals and the N groups of random access preambles, and N is an integer greater than 1. The base station receives a message 3 sent repeatedly or in a diversity mode by the terminal device. The base station receives the random access preamble sent by the terminal device. The base station sends a random access response. The base station receives the message 3 sent by the terminal device. The random access configuration information and/or the association information are/is further used to determine a correspondence between the N groups of random access preambles and a manner of sending the message 3 by the terminal device.

The association information between the downlink signals and the random access preambles includes: One random access occasion includes the N groups of random access preambles. One downlink signal is associated with all random access preambles in each of the N groups of random access preambles, or M downlink signals are sequentially associated with random access preambles in each of the N groups of random access preambles, and M is an integer greater than 1.

The manner of sending the message 3 includes: repeatedly sending the message 3, sending the message 3 in a frequency hopping mode, and sending the message 3 in a diversity mode.

According to the method provided in the first aspect, the base station may include all or a part of the random access configuration information in system information to indicate the terminal device to send the message 3 repeatedly or in a diversity mode. Alternatively, the base station may include all or a part of the random access configuration information in the random access response to indicate the terminal device to send the message 3 repeatedly or in a diversity mode.

Configuration information may be used to determine a quantity of repetitions for repeatedly sending the message 3, and the quantity of repetitions may be any one of 2, 4, 8, 16, and 32. The configuration information may be used to determine a receiving threshold of a downlink received signal. The receiving threshold of the downlink received signal is a threshold of a received signal power of a synchronization signal/physical broadcast channel block.

Specifically, frequency hopping frequency offset in the system information may be used, or a time interval for repeated sending may be specified. The time interval may be a symbol interval in a slot, or may be a slot interval. The time interval in at least one embodiment is a difference between start slots of two times of transmission of the message 3.

Specifically, any one or more of two parameters: a frequency hopping offset and a repetition time interval may be further configured in the random access response.

Specifically, that the random access response indicates the sending the message 3 repeatedly or in a diversity mode may be indicated by using some data bits of time alignment. When the terminal device does not need to send the message 3 repeatedly or in a diversity mode, in other words, the random access preamble received by the base station is not a random access preamble indicating to send the message 3 repeatedly or in a diversity mode, a value of a data bit that is used to carry indication information and that is in the time alignment may be set to 0 in this case. Some data bits in the time alignment may indicate information related to the sending repeatedly or in a diversity mode by the terminal device. The related information includes a part or all of information about a quantity of repetitions, frequency offsets of different quantities of repetitions, and time intervals between the different quantities of repetitions. The system information may indicate a quantity of useful data bits in the time alignment, or indicate a data bit of Msg3 related information. Alternatively, a quantity of data bits of related information and a related value are directly specified in a protocol.

Specifically, the random access response indicates that the sending the message 3 repeatedly or in a diversity mode may be indicated by using a header in the random access response, including: The base station may use a header corresponding to the random access response to carry an indication. The header may be bound to the random access preamble. Alternatively, the base station may redefine an identifier of a header, where all related information is placed in a random access response corresponding to the header.

According to a second aspect, this application provides a random access method, applied to a terminal device. The method includes: The terminal device sends a first random access preamble when the terminal device needs to send a message 3 repeatedly or in a diversity mode. The first random access preamble is selected from a specific group of a plurality of groups of random access preambles. The plurality of groups of random access preambles are a plurality of groups of random access preambles obtained after contention free random access preambles are grouped or contention based random access preambles are grouped. The specific group is at least one group of contention free random access preamble groups or is at least one group of contention based random access preamble groups. The terminal device receives an indication. The indication indicates a manner of sending the message 3 repeatedly or in a diversity mode by the terminal device and/or indicates a position of a time domain resource and/or a position of a frequency domain resource for sending the message 3 repeatedly or in a diversity mode by the terminal device. The terminal device sends the message 3 repeatedly or in a diversity mode.

Association information between downlink signals and random access preambles includes: One random access occasion includes N groups of random access preambles. One downlink signal is associated with all random access preambles in each of the N groups of random access preambles, or M downlink signals are sequentially associated with random access preambles in each of the N groups of random access preambles, and M is an integer greater than 1.

According to the method provided in the second aspect, the terminal device may obtain, from system information, an indication sent by a base station. Alternatively, the terminal device may obtain, from a synchronization signal block index, the indication sent by the base station. Alternatively, the terminal device may obtain, from a random access response, the indication sent by the base station. After obtaining the base station indication sent by the base station, the terminal device sends the message 3 repeatedly or in a diversity mode in a manner of sending repeatedly or in a diversity mode that is specified by the indication and on a time domain resource and/or a frequency domain resource specified by the indication.

Specifically, that the sending the message 3 repeatedly or in a diversity mode is indicated in the system information may be that a frequency hopping frequency offset of the sending repeatedly or in a diversity mode may be specified or a time interval for the sending repeatedly or in a diversity mode may be specified in the system information. The time interval may be a symbol interval in a slot, or may be a slot interval. The time interval in at least one embodiment is a difference between start slots of two times of transmission of the message 3.

Specifically, that the sending the message 3 repeatedly or in a diversity mode is indicated in the synchronization signal block index may be notified through binding the synchronization signal block index. A notification manner is {SSB index, K}. K may indicate a quantity of times of repeatedly sending the message 3, or a manner of sending in a diversity mode and a quantity of times of sending the message 3 in a diversity mode. The terminal device obtains, by reading a value of K, information related to the sending the message 3 repeatedly or in a diversity mode by the terminal device.

Specifically, that the random access response indicates the sending the message 3 repeatedly or in a diversity mode may be indicated by using some data bits of time alignment. When the terminal device does not need to send the message 3 repeatedly or in a diversity mode, in other words, a random access preamble received by the base station does not belong to the specific group, a value of a data bit that is used to carry indication information and that is in the time alignment may be set to 0 in this case. When the terminal device needs to send the message 3 repeatedly or in a diversity mode, in other words, the terminal selects a random access preamble from the specific group for sending, that is, the terminal device sends the first random access preamble, after receiving the first random access preamble, the base station determines that the first random access preamble belongs to the specific group, and learns that the terminal device needs to send the message 3 repeatedly or in a diversity mode. In this case, some data bits in the time alignment may be used to indicate information related to the sending repeatedly or in a diversity mode by the terminal device. The related information includes a part or all of information about a quantity of repetitions, frequency offsets of different quantities of repetitions, and time intervals between the different quantities of repetitions.

Specifically, that the random access response indicates the sending the message 3 repeatedly or in a diversity mode may be indicated by using a header in the random access response, including: The terminal device may obtain an indication from a header corresponding to the random access response. The header may be bound to the random access preamble. Alternatively, the base station may redefine an identifier of a header, where all related information is placed in a random access response corresponding to the header, and agree on information related to the identifier of the header with the terminal device before the indication is sent. The terminal device obtains the indication from a random access response corresponding to the identifier of the header newly defined by the base station.

Specifically, any one or more of two parameters: a frequency hopping offset and a repetition time interval may be further configured in the random access response.

With reference to the second aspect, in some embodiments, some terminal devices among terminal devices that prepare to initiate the random access method do not support the sending the message 3 repeatedly or in a diversity mode, that is, do not select the first random access preamble as a message 1 for sending in a random access response process. Correspondingly, some terminal devices support the sending the message 3 repeatedly or in a diversity mode, and select, when considering, based on parameters such as a channel loss, a transmit power, and a receive power, that it is necessary to send the message 3 repeatedly or in a diversity mode, the first random access preamble as the message 1 for sending. A corresponding terminal device that supports the sending the message 3 repeatedly or in a diversity mode may choose not to send the message 3 repeatedly or in a diversity mode, that is, does not select the first random access preamble as the message 1 for sending, and selects a random access preamble that is not in the specific group as the message 1 for sending.

According to a third aspect, this application provides a random access method, applied to a terminal device and a base station.

The terminal device sends a first random access preamble when the terminal device needs to send a message 3 repeatedly or in a diversity mode. The first random access preamble is selected from a specific group of a plurality of groups of random access preambles. The plurality of groups of random access preambles are a plurality of groups of random access preambles obtained after contention free random access preambles are grouped or contention based random access preambles are grouped. The specific group is at least one group of contention free random access preamble groups or is at least one group of contention based random access preamble groups. The base station receives the first random access preamble sent by the terminal device. Because the first random access preamble belongs to the specific group, the base station learns that the terminal device needs to send the message 3 repeatedly or in a diversity mode. The base station sends an indication. The indication indicates a manner of sending the message 3 repeatedly or in a diversity mode by the terminal device. The terminal device receives the indication. The indication indicates a manner of sending the message 3 repeatedly or in a diversity mode by the terminal device and/or indicates a position of a time domain resource and/or a position of a frequency domain resource for sending the message 3 repeatedly or in a diversity mode by the terminal device. The terminal device sends the message 3 repeatedly or in a diversity mode.

Association information between downlink signals and random access preambles includes: One random access occasion includes N groups of random access preambles. One downlink signal is associated with all random access preambles in each of the N groups of random access preambles, or M downlink signals are sequentially associated with random access preambles in each of the N groups of random access preambles, and M is an integer greater than 1.

A manner of sending the message 3 includes: repeatedly sending the message 3, sending the message 3 in a frequency hopping mode, and sending the message 3 in a diversity mode.

According to the method provided in the third aspect, the terminal device may obtain, from system information, the indication sent by the base station. Alternatively, the terminal device may obtain, from a synchronization signal block index, the indication sent by the base station. Alternatively, the terminal device may obtain, from a random access response, the indication sent by the base station. Correspondingly, the base station may indicate, in the system information, the message 3 sent repeatedly or in a diversity mode by the terminal device. Alternatively, the base station may indicate, in the synchronization signal block index, the message 3 sent repeatedly or in a diversity mode by the terminal device. Alternatively, the base station may indicate, in the random access response, the message 3 sent repeatedly or in a diversity mode by the terminal device. After obtaining the base station indication sent by the base station, the terminal device sends the message 3 repeatedly or in a diversity mode in a manner of sending repeatedly or in a diversity mode that is specified by the indication and on a time domain resource and/or a frequency domain resource specified by the indication. Correspondingly, after sending the indication, the base station demodulates, in a corresponding manner on a corresponding time domain resource and/or a corresponding frequency domain resource, the message 3 sent by the terminal device.

Specifically, that the sending the message 3 repeatedly or in a diversity mode is indicated in the system information may be that a frequency hopping frequency offset of the sending repeatedly or in a diversity mode may be specified or a time interval for the sending repeatedly or in a diversity mode may be specified in the system information. The time interval may be a symbol interval in a slot, or may be a slot interval. The time interval in at least one embodiment is a difference between start slots of two times of transmission of the message 3.

Specifically, that the sending the message 3 repeatedly or in a diversity mode is indicated in the synchronization signal block index may be notified through binding the synchronization signal block index. A notification manner is {SSB index, K}. K may indicate a quantity of times of repeatedly sending the message 3, or a manner of sending in a diversity mode and a quantity of times of sending the message 3 in a diversity mode. The terminal device obtains, by reading a value of K, information related to the sending the message 3 repeatedly or in a diversity mode by the terminal device.

Specifically, that the random access response indicates the sending the message 3 repeatedly or in a diversity mode may be indicated by using some data bits of time alignment. When the terminal device does not need to send the message 3 repeatedly or in a diversity mode, in other words, a random access preamble received by the base station does not belong to the specific group, a value of a data bit that is used to carry indication information and that is in the time alignment may be set to 0 in this case. When the terminal device needs to send the message 3 repeatedly or in a diversity mode, in other words, the terminal selects a random access preamble from the specific group for sending, that is, the terminal device sends the first random access preamble, after receiving the first random access preamble, the base station determines that the first random access preamble belongs to the specific group, and learns that the terminal device needs to send the message 3 repeatedly or in a diversity mode. In this case, some data bits in the time alignment may be used to indicate information related to the sending repeatedly or in a diversity mode by the terminal device. The related information includes a part or all of information about a quantity of repetitions, frequency offsets of different quantities of repetitions, and time intervals between the different quantities of repetitions.

Specifically, that the random access response indicates the sending the message 3 repeatedly or in a diversity mode may be indicated by using a header in the random access response, including: The terminal device may obtain an indication from a header corresponding to the random access response. The header may be bound to the random access preamble. Alternatively, the base station may redefine an identifier of a header, where all related information is placed in a random access response corresponding to the header, and agree on information related to the identifier of the header with the terminal device before the indication is sent. The terminal device obtains the indication from a random access response corresponding to the identifier of the header newly defined by the base station.

According to a fourth aspect, an embodiment of this application provides a base station. The base station includes a memory, a processor coupled to the memory, and one or more programs. When the one or more programs are run on the base station, the base station is enabled to perform the method according to any one of the first aspect or the possible implementations of the first aspect.

According to a fifth aspect, an embodiment of this application provides a terminal device. The terminal device includes a memory, a processor coupled to the memory, and one or more programs. When the one or more programs are run on the terminal device, the terminal device is enabled to perform the method according to any one of the second aspect or the possible implementations of the second aspect.

According to a sixth aspect, an embodiment of this application provides a non-transitory computer-readable recording medium, including instructions. When the instructions are run on a base station, the base station is enabled to perform the method according to any one of the first aspect or the possible implementations of the first aspect.

According to a seventh aspect, an embodiment of this application provides a non-transitory computer-readable recording medium, including instructions. When the instructions are run on a terminal device, the terminal device is enabled to perform the method according to any one of the second aspect or the possible implementations of the second aspect.

BRIEF DESCRIPTION OF DRAWINGS

FIG. 4 is a schematic diagram of a random access method according to an embodiment of this application;

FIG. 5 is a schematic diagram of a random access scenario according to an embodiment of this application;

FIG. 6 is an indication method using a field in configuration information according to an embodiment of this application;

FIG. 7 is a schematic diagram of a relationship between a threshold for a downlink signal and whether to perform repeated sending according to an embodiment of this application;

FIG. 8 and FIG. 9 are schematic diagrams of a relationship between a random access preamble group and random access time according to an embodiment of this application;

FIG. 12 is a schematic diagram of configuration information included in time alignment according to an embodiment of this application;

DESCRIPTION OF EMBODIMENTS

Figure 1:
FIG. 1 is a schematic diagram of a structure of a random access system according to this application.

Terms used in the following embodiments of this application are merely intended to describe specific embodiments, but are not intended to limit this application. Terms "one", "a", "the foregoing", "this", and "the one" of singular forms used in this specification and the appended claims of this application are also intended to include plural forms, unless the opposite is explicitly indicated in the context thereof. It should be further understood that a term "and/or" used in this application indicates and includes any one or all of possible combinations of one or more listed items.

Terms "first", "second", "group 1", and "group 2" mentioned below are merely intended for a purpose of description, and shall not be understood as an indication or implication of relative importance or an implicit indication of a quantity of indicated technical features. Therefore, a feature limited by "first" or "second" may explicitly or implicitly include one or more features. In the descriptions of embodiments of this application, unless otherwise specified, "a plurality of" means two or more than two. In descriptions of embodiments of this application, unless otherwise specified, meanings of sending repeatedly or sending in a diversity mode includes: A message is sent at least once. Sending manners at different times of sending may be a same sending manner, or may be different sending manners. In a specific embodiment of this application, the sending manner includes a diversity-based manner, including: a frequency diversity-based manner, a coding diversity-based manner, and the like.

For ease of understanding, the following first describes related terms and related concepts that are used in embodiments of this application.

A QCL relationship is short for a quasi co-located (QCL) relationship. An association in this application may also be referred to as mapping, a correspondence, and a correlation. When there is QCL between two signals, at least one of sending or receiving a signal by using a same delay spread, a same Doppler spread, a same average gain, a same average delay, and a same spatial domain parameter, or sending or receiving a signal by using a same beam may be used. A quasi co-position parameter includes at least one of a Doppler spread, a Doppler frequency shift, an average delay, a delay spread, and a spatial domain reception parameter. The QCL relationship may be classified into four types: 'QCL-TypeA': {Doppler frequency shift, Doppler spread, average delay, and delay spread}; 'QCL-TypeB': {Doppler frequency shift, and Doppler spread}; 'QCL-TypeC': {Doppler frequency shift, and average delay}; and 'QCL-TypeD': {spatial domain reception parameter}. A QCL relationship parameter may be selected randomly. For example, an average gain and "QCL-TypeD" are selected.

Beam: A beam in an NR protocol may be referred to as a spatial domain filter (spatial domain filter), a spatial filter (spatial filter), or a spatial parameter (spatial parameter). A beam used to send a signal may be referred to as a transmission beam (Tx beam), or may be referred to as a spatial domain transmission filter (spatial domain transmission filter) or a spatial transmission parameter (spatial transmission parameter). A beam used to receive a signal may be referred to as a reception beam (Rx beam), or may be referred to as a spatial domain receive filter (spatial domain receive filter) or a spatial receive parameter (spatial RX parameter).

A transmission beam may refer to distribution of signal strength formed in different directions in space after a signal is transmitted through an antenna, and a reception beam may refer to distribution of signal strength that is of a radio signal received from an antenna and that is in different directions in space.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like.

A beam is represented in a form of a reference signal in a communication process between a terminal and a base station, and the reference signal is an SSB. In this aspect, an index of the beam is also an index of the SSB. Another signal is sent and/or received with reference to the index of the SSB. Sending and/or receiving of another signal include/ includes sending of a system message, sending of an RAR, and receiving of a PARCH. For the another signal referring to the index of the SSB, the another signal and the reference SSB use a same beam. For example, the SSB is sent through a first beam, and is denoted as an SSB whose index is 1. Therefore, a system message, a PARCH, a message 2, a message 3, and a message 4 corresponding to the SSB whose index is 1 are sent and/or received through the beam 1.

The beam generally corresponds to a resource or a signal. For example, during beam measurement, a network device measures different beams by using different resources, and a terminal device feeds back measured resource quality, so that the network device knows quality of a corresponding beam. During data transmission, beam information is also indicated by using a resource corresponding to the beam information. For example, the network device indicates information about a physical downlink shared channel beam to the terminal device through a resource in TCI of downlink control information.

Optionally, a plurality of beams that have same or similar communication features may be considered as one beam. One beam may include one or more antenna ports, configured to transmit a data channel, a control channel, a sounding signal, and the like. The one or more antenna ports forming the beam may also be considered as one antenna port set.

In embodiments of this application, unless otherwise specified, the beam is a transmission beam of the network device. During beam measurement, each beam of the network device corresponds to one resource. Therefore, an index of the resource may be used to uniquely identify a beam corresponding to the resource. The beam may be represented, in a standard, by using the QCL relationship.

A system information block includes system information. A cell has a plurality of system information blocks, and information carried in these system information blocks is different. For example, an SIB 1 mainly carries configuration information of some cells, for example, random access configuration information, information related to a physical downlink control channel, information related to another information block, information about a cell accessed by UE, and identification information of a cell. The system information block includes PBCH information of the system information block and a PDSCH of the system information block. A physical downlink control channel mainly schedules positions of a time domain resource and a frequency domain resource of a physical downlink shared channel.

Downlink signal: The downlink signal is a signal sent by a base station to a terminal. The downlink signal may be at least one of a synchronization signal block (SS block), a channel state information reference signal (CSI-RS), a reference signal, and system information. In some embodiments, a case in which the downlink signal is a synchronization signal block is mainly considered. When the downlink signal is a "CSI-RS", a method the same as that in the foregoing embodiment may be used. To be specific, the "synchronization signal block" may be replaced with the "CSI-RS" in this embodiment.

Synchronization signal block: A synchronization signal block (SSB) may also be referred to as a synchronization signal (SS)/physical broadcast channel (PBCH) block. The SS/PBCH block includes at least one of the following: a primary synchronization signal (PSS), a secondary synchronization signal (SSS), a PBCH, and a demodulation reference signal (DMRS). The SS/PBCH block may also be referred to as an SSB/PBCH block, and signals in the SS/PBCH block or the SSB/PBCH block may be a same antenna port. Before a terminal device sends a random access preamble, when beamforming is used in 5G, the terminal device first needs to detect and select a beam for random access. The terminal device is provided, through a higher-layer parameter ssb-perRACH-OccasionAndCB-PremblesPerSSB, with N synchronization signal blocks (Synchronization Signal and PBCH blocks, SSBs) associated with a sending occasion of a physical random access channel (PARCH) and R contention based PARCH preambles of each SSB. If N is less than 1, the SSB is mapped to 1/N consecutive PRACH sending occasions. If N is greater than 1, R contention based random access preambles with consecutive indexes (starting from an index $$n \cdot N^{total}_{preamble} / N)$$

are associated with SSBn, where $0 \leq n \leq N-1$.

$$N^{total}_{preamble}$$

is a quantity of random access preambles used for random access on a random access occasion, and $$N^{total}_{preamble}$$

is configured by a higher-layer parameter totalNumberOfRA-Preambles.

Association period: There are K1 SSBs in one SSB period, the association period includes one or more configuration periodicities, one random access configuration period includes one or more random access occasions, and the K1 SSBs are associated with all random access occasions in the association period.

A physical uplink control channel (PUCCH) is used to transmit uplink control information, including scheduling request (SR) information, channel state information (SI), and the like, sent by a terminal device to a base station.

A transmit power is also referred to as an output power. The transmit power may be defined as an output power obtained through measurement on all or a part of supported frequencies, frequency bands, or bandwidths within given time and/or a given period. For example, measurement time is at least 1 ms. For another example, measurement time is at least one slot corresponding to a subcarrier spacing. In an embodiment, a power obtained by using the measurement time of at least 1 ms is used.

A diversity-based sending method includes: a closed loop method and an open loop method. The closed loop method includes: A receiving end feeds back expected precoding information to a transmitting end. The transmitting end performs precoding processing on sent data and a reference signal based on feedback of the receiving end. The open loop method includes: A transmitting end does not perform precoding processing on sent data and a reference signal based on feedback of a receiving end device. For uplink open loop transmission, the transmitting end is a terminal, and the receiving end is a base station. For downlink open loop transmission, the receiving end is a terminal, and the transmitting end is a base station. Random access (RA) is an information exchange mechanism (or process) for establishing a connection between a network and a device that does not access the network in an LTE or 5G communication system with access control. Because a random access process is started in a random access channel (RACH), RA and a RACH are often interchangeably used in a protocol and spoken language. There are two types of random access: contention based random access and contention free random access. The contention based random access is usually divided into four steps, and each step corresponds to one message, including a message 1, a message 2, a message 3, and a message 4, which respectively carry different signaling or information. The contention free random access includes only the first two steps. In addition, to reduce access time of the four-step contention based random access, there is further two-step random access. The two-step random access includes a message A and a message B. The message A includes a preamble and first data information (which are similar to the message 1 and the message 3 in four-step random access). The message B includes contention resolution and uplink scheduling (which are similar to the message 2 and the message 4 in the four-step random access).

A random access resource configuration period (a PRACH configuration period/PRACH period/PRACH density) is also referred to as a random access period. The random access resource configuration period includes random access resources of a plurality of time points, frequencies, preambles, or sequences, and these resources form a random access resource pattern. The random access resource configuration period is also a time interval at which the random access resource pattern recurs. A random access resource within the random access resource configuration period is associated with all actually transmitted downlink signals in a downlink signal set. It may be understood that a random access resource associated with a downlink signal recurs in a time length of the random access resource configuration period.

Random access opportunity: A random access opportunity is also referred to as a random access resource (a RACH resource), a random access occasion (a RACH occasion/RACH opportunity/RACH chance, RO), or a random access transmission opportunity (a RACH transmission occasion), and refers to a time resource or frequency resource used to carry one or more random access preambles. Logically, the random access opportunity is used to carry information/a signal of a PARCH. The random access opportunity is sometimes equivalently referred to as a physical random access opportunity (a PRACH occasion, PO) or a physical random access resource (a PRACH resource).

A message 1 (Msg 1) is a random access preamble (a preamble or a sequence), and is included in a PRACH. The message 1 is usually used to initiate a connection request, a handover request, a synchronization request, or a scheduling request between a device and a network.

A random access preamble group may also be understood as a random access preamble set. One random access preamble group includes at least one random access preamble on one random access occasion. When the random access preamble group includes N (N>1) random access preambles, the plurality of random access preambles are N random access preambles with consecutive index numbers on one random access occasion. One random access preamble group may alternatively be a set including N (N>1) random access preambles on a plurality of different random access occasions.

A message 2 (Msg 2) is also referred to as a random access response (RAR) message. The message 2 is a response of a network side to a received message 1, and one message 2 may respond to a plurality of Msgs 1. For a single random access preamble, there is a specific random access response message in MAC. However, a base station usually encapsulates responses of all random access preambles detected on one random access opportunity together, to form one Msg2. To be specific, after sending a random access preamble, a terminal searches a corresponding message 2 for a random access response message corresponding to the random access preamble sent by the terminal, and ignores a response message for another random access preamble.

If the network side receives a message 1, the network side encapsulates and sends at least one piece of the following information: an index (a random access preamble identity, RAPID) of the message 1, an uplink scheduling grant (an uplink grant), timing advance (timing advance), a temporary cell radio network temporary identity (TC-RNTI), and the like. The network side may respond to a plurality of Msgs 1 in a same Msg 2.

A message 3 (Msg3) is also referred to as first uplink scheduling transmission, and is a retransmission scheduled through a UL grant in a message 2, or a retransmission scheduled through DCI scrambled by a TC-RNTI. Content transmitted in the Msg 3 is a higher-layer message, for example, a connection establishment request message (which may be specifically identification information of a user initiating a connection request). This message is used for contention resolution. If a plurality of different devices use a same Msg 1 for random access, the Msg 3 and a Msg 4 may be used together to determine whether a conflict occurs. A definition of the Msg3 in a protocol is: Message transmitted on UL-SCH (uplink shared channel) containing a C-RNTI MAC (Medium access control) CE (control element) or CCCH (Common Control Channel) SDU (Service Data Unit), submitted from upper layer and associated with the UE Contention Resolution Identity, as part of a Random Access procedure. Transmission of the message 3 includes retransmission and power control (in other words, there is power control information in a UL grant for scheduling initial transmission or retransmission).

A message 4 (Msg 4) is used for contention resolution. Generally, the message 4 includes a CCCH SDU included in a message 3. If a device detects, in the message 4, the CCCH SDU sent by the device, it is considered that contention based random access succeeds, and a subsequent communication process continues. The message 4 may be retransmitted. To be specific, there is a corresponding PUCCH for transmitting feedback information (which indicates whether the message 4 is successfully detected). There is power control in the feedback information sent by the device on the PUCCH.

A random access process of a terminal device may be triggered by a series of events, for example, access in a radio resource control (RRC) idle mode, an RRC connection reestablishment process, a cell handover, an event in which downlink data arrives but uplink synchronization is not achieved in an RRC connected mode, an event in which uplink data is required but uplink data is not synchronized in the RRC connected mode, an event in which the terminal device needs to change from an RRC_INACTIVE state to another state, an event in which beam management needs to be performed, and an event in which SI information needs to be obtained.

A random access preamble may be generated by using a Z-C sequence. Each cell includes L available random access preambles, which are generated through cyclic shift of one or more Zadoff-Chu (Z-C) sequences with a root length of 139 or 893, and are mapped to specific time domain and frequency domain resources. L is set to 64 in some scenarios. The random access preamble is transmitted on a specific time-frequency resource. A PARCH resource in a radio frame is indicated by a PARCH configuration index provided by a higher layer. A plurality of PRACH preamble formats may be defined by using different quantities of symbols, different cyclic prefixes (CPs), and guard time (GT). Before a terminal device sends a random access preamble, when beamforming is used in 5G by default, the 5G terminal device first needs to detect and select a beam for random access. In some random access scenarios, a base station signs, based on a requirement, a random access preamble allocated by the terminal device. In this case, a random access process is a contention free random access process. Alternatively, in some random access scenarios, the terminal device randomly selects access based on a random access parameter broadcasted in system information of a cell. In this case, a random access process is a contention based random access process.

Because embodiments of this application relate to random access, for ease of understanding, a random access process is described. FIG. 1 is a schematic diagram of a structure of a random access system according to this application. As shown in FIG. 1, a scenario in this application includes a base station and a terminal device. The base station communicates with the terminal device.

The base station may be a device that can communicate with the terminal device. In this application, the base station may be a base station terminal device, a relay station, or an access point. The base station may be a base transceiver station (BTS) in a global system for mobile communication (GSM) or code division multiple access (CDMA) network, or may be an NB (NodeB) in wideband code division multiple access (WCDMA), or may be an eNB or an eNodeB (Evolutional NodeB) in long term evolution (LTE). The base station may alternatively be a radio controller in a cloud radio access network (CRAN) scenario. The base station may alternatively be a base station terminal device in a future 5G network or a network terminal device in a future evolved PLMN network. Alternatively, the base station may be a wearable terminal device or a vehicle-mounted terminal device. Alternatively, the base station may be an exciter or a receiver.

The terminal device may be user equipment (UE), an access terminal, a UE unit, a UE station, a mobile station, a remote station, a remote terminal, a terminal device, a UE terminal, a terminal, a wireless communication device, a UE agent or a UE apparatus, or the like. The terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5th generation mobile communication technology (a 5th Generation Mobile Network, 5G) network or a terminal device in a future evolved public land mobile network (PLMN), or the like.

Figure 2:
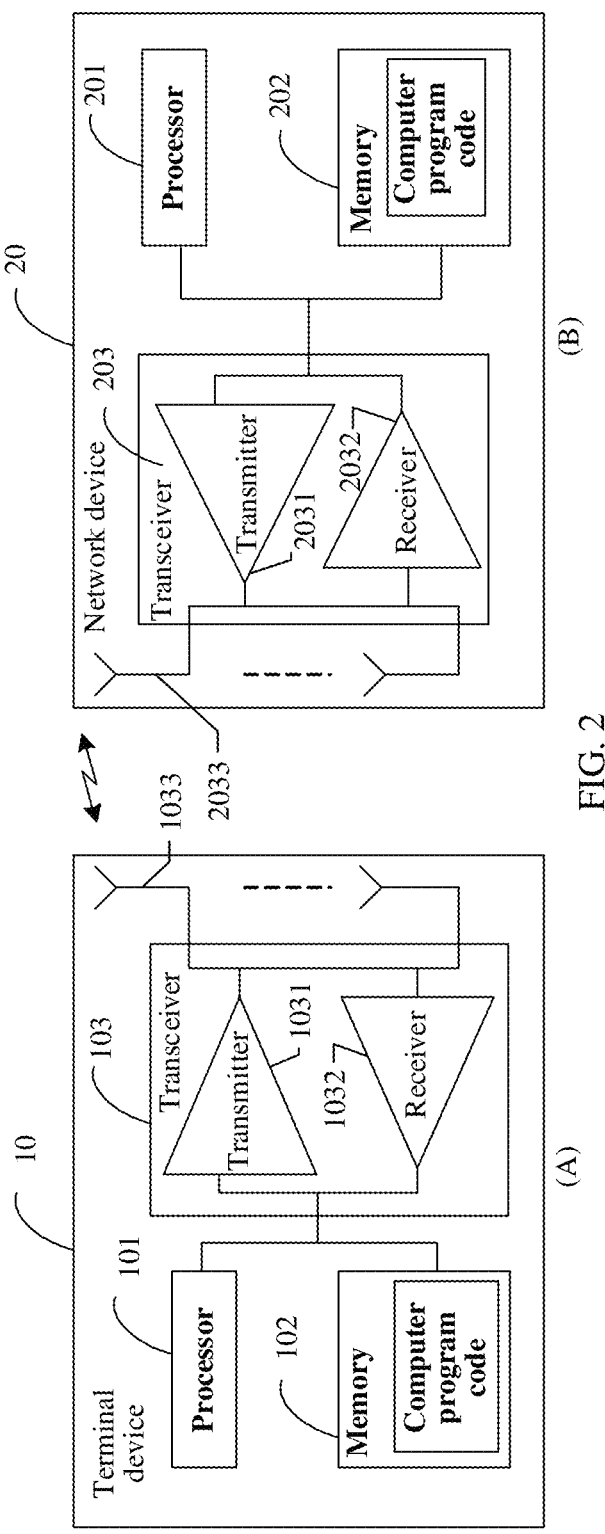
FIG. 2 are architectures of a base station and a terminal device in FIG. 1.

FIG. 2 are architectures of a base station and a terminal device in FIG. 1. As shown in FIG. 2, specific architectures of the base station and the terminal device in FIG. 1 include:

As shown in FIG. 2(A), a terminal device 10 includes a processor 101, a memory 102, and a transceiver 103. The transceiver 103 includes a transmitter 1031, a receiver 1032, and an antenna 1033.

A base station 20 includes a processor 201, a memory 202, and a transceiver 203. The transceiver 203 includes a transmitter 2031, a receiver 2032, and an antenna 2033. The receiver 1032 may be configured to receive transmission control information through the antenna 1033, and the transmitter 1031 may be configured to send transmission feedback information to a network terminal device 20 through the antenna 1033. The transmitter 2031 may be configured to send transmission control information to the terminal device 10 through the antenna 2033. The receiver 2032 may be configured to receive, through the antenna 2033, transmission feedback information sent by the terminal device 10.

Figure 3:
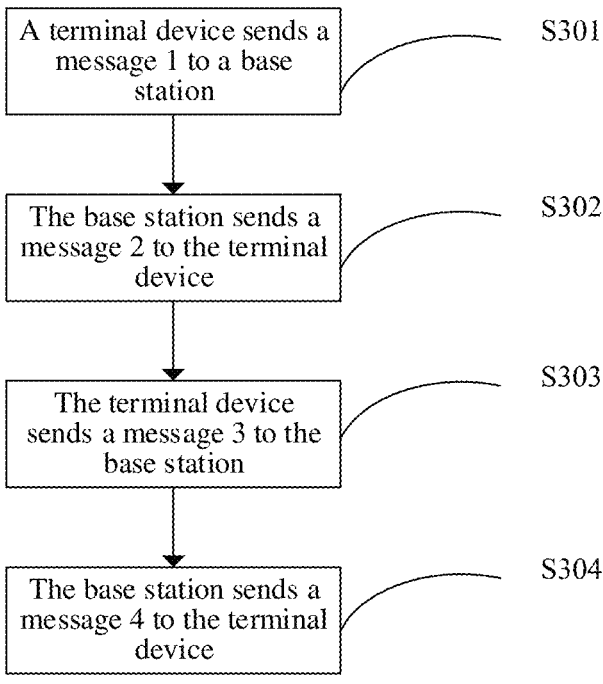
FIG. 3 is a schematic diagram of a random access process according to this application.

FIG. 3 is a schematic diagram of a random access process according to this application. In an LTE or 5G communication system with access control, RA is an information exchange mechanism or process for establishing a connection between a terminal device that does not access a network and a base station. The random access process is classified into a contention based random access (CBRA) process and a contention free random access (CFRA) process. The contention based random access is generally divided into four steps:

S301: A terminal device sends a message 1 to a base station. Correspondingly, the base station receives the message 1 sent by the terminal device. The message 1 is a random access preamble (a preamble or a sequence), and is included in a PRACH. The message 1 is usually used to initiate a connection request, a handover request, a synchronization request, a scheduling request, and the like, between a terminal device and a network. The message 1 may include two types of preambles: a contention based random access preamble and a contention free random access preamble. The contention based random access preamble is generally used for random access, and the contention free random access preamble is generally used for random access in a connected mode.

S302: The base station sends a message 2 to the terminal device. Correspondingly, the terminal receives the message 2 sent by the base station terminal device. The message 2 is also referred to as a random access response message. The message 2 is a response of a network side to a received message 1, and one message 2 may respond to a plurality of messages 1. If the network side receives a message 1, the network side encapsulates and sends at least one piece of the following information: an index (a random access preamble identity, RAPID) of the message 1, an uplink scheduling grant (an uplink grant), a time alignment value (a Timing Advance Command, TAC), a TC-RNTI, and the like. The network side may respond to a plurality of messages 1 in a same message 2. A random access response access window (RAR-Window) is defined in a protocol and is used to receive the message 2. If the terminal device does not receive the message 2 within a continuous period of the random access response access window, it is considered that the message 1 fails to be sent. A random access-radio network temporary identity (RA-radio network temporary identity, RA-RNTI) is used to scramble a physical downlink control channel (PDCCH) of the message 2. The terminal may identify the message 2 of the terminal based on the RA-RNTI. Each RA-RNTI uniquely corresponds to an RO, and generation of the RA-RNTI is related to a position of a time-frequency resource of the RO.

S303: The terminal device sends a message 3 to the base station. Correspondingly, the base station receives the message 3 sent by the terminal device. The message 3 is also referred to as first uplink scheduling transmission, and is a retransmission scheduled through a UL grant (a UP-link grant, an uplink connection grant resource) in the message 2, or a retransmission scheduled through downlink control information (DCI) scrambled by a TC-RNTI. Content transmitted in the message 3 is a higher-layer message, for example, a connection establishment request message (which may be specifically identification information of a user initiating a connection request). The message is used for contention resolution. If a plurality of different terminal devices use a same message 1 to perform random access, the message 3 and a message 4 may be used together to determine whether a conflict occurs. A definition of the Msg3 in a protocol is: Message transmitted on UL-SCH (uplink shared channel) containing a C-RNTI MAC (Medium access control) CE (control element) or CCCH (Common Control Channel) SDU (Service Data Unit), submitted from upper layer and associated with the Contention Resolution Identity, as part of a Random Access procedure. Transmission of the message 3 includes retransmission and power control (in other words, there is power control information in a UL grant for scheduling initial transmission or retransmission).

S304: The base station sends the message 4 to the terminal device. Correspondingly, the terminal receives the message 4 sent by the base station terminal device. The message 4 is used for contention resolution. Generally, the message 4 includes a CCCH SDU included in the message 3. If the terminal device detects, in the message 4, the CCCH SDU sent by the terminal device, it is considered that contention based random access succeeds, and a subsequent communication process continues. The message 4 may be retransmitted. To be specific, there is a corresponding PUCCH for transmitting feedback information (which indicates whether the message 4 is successfully detected). There is power control in the feedback information sent by the terminal device on the PUCCH.

In another embodiment, to reduce access time of the four-step contention based random access, there is further two-step random access. The two-step random access includes a message A and a message B. The message A includes a preamble and first data information (which are similar to the message 1 and the message 3 in four-step random access). The message B includes contention resolution and uplink scheduling (which are similar to the message 2 and the message 4 in the four-step random access).

The contention free random access includes only the first two steps, including S301 and S302.

In a conventional technology, the message 3 is initially transmitted only once, and a resource for the initial transmission is scheduled through an uplink scheduling grant (an uplink grant, UL grant) in the message 2. There is no indication for repeated sending or diversity-based sending and only information such as a time domain position, a frequency domain position, and a modulation and coding scheme of the initial transmission of the message 3 in the UL grant. In the conventional technology, a process of sending the message 3 by the terminal device supports a hybrid automatic repeat request (HARQ). When the terminal device sends the message 3 to perform HARQ retransmission, the base station needs to send an acknowledgment character (ACK) or a negative acknowledgment character (NACK) to the terminal device. In a complex environment such as a weak signal-to-noise ratio and large channel fading scenario, when the terminal device initiates a random access process, the base station cannot receive the message 3 sent by the terminal device. As a result, the random access fails or HARQ retransmission of the message 3 is performed. Therefore, robustness of the random access process is poor, and a delay of the random access process is increased.

With reference to FIG. 4, to resolve the foregoing problem, this application provides a random access method, to send a message 3 repeatedly or in a diversity mode. To implement the sending the message 3 repeatedly or in a diversity mode, this application proposes that it may be indicated in a message 2 or system information that a terminal device can send the message 3 repeatedly or in a diversity mode. Sending a message repeatedly or in a diversity mode in the technical solutions of this application can effectively improve a probability that a base station detects the message, improve robustness of a random access process, and improve coverage performance of an uplink signal.

Further, for a terminal device in R15 and/or R16, repeated sending, a quantity of times of the repeated sending, or diversity-based sending cannot be identified. Further, the base station does not have information reported by the terminal to determine whether the message 3 needs to be sent repeatedly or in a diversity mode. Therefore, the base station cannot determine whether the sending the message 3 repeatedly or in a diversity mode is to be performed. Consequently, the base station considers a worst case, and determines, based on the worst case, that the sending the message 3 repeatedly or in a diversity mode is entirely performed, or the sending the message 3 repeatedly or in a diversity mode is not performed at all. If all terminal devices send the message 3 repeatedly or in a diversity mode, but some terminal devices inherently have good performance, resources are wasted.

In a specific embodiment of this application, the terminal device in R15 and/or R16 includes a terminal device that uses an R15 standard and/or an R16 standard, and a terminal device that does not agree with a base station on repeated sending or diversity-based sending. A terminal device in R17 and/or a subsequent release includes a terminal device that uses an R17 standard or another subsequent communication protocol standard, and a terminal device that agrees with a base station on repeated sending or diversity-based sending.

It should be noted that, this is different from the sending the message 3 repeatedly in the technical solutions of this application. The sending the message 3 repeatedly in the technical solutions of this application means that a same message 3 is sent more than once in a random access process, without waiting for a base station to return an acknowledgment character or a negative acknowledgment character, and therefore a delay is reduced.

FIG. 4 is a schematic diagram of a random access method according to an embodiment of this application. FIG. 5 is a schematic diagram of a random access scenario according to an embodiment of this application.

As shown in FIG. 4, the random access method according to this application includes the following steps.

S401: A base station sends configuration information and a downlink signal, including:

A terminal device receives an SSB, and determines a received reference SSB signal based on a reference signal received power of the SSB. The terminal device receives, based on the reference SSB signal, random access configuration information sent by the base station. The random access configuration information includes at least one of repeated sending information or diversity-based sending information of a message 3.

That the random access configuration information indicates the sending the message 3 repeatedly or in a diversity mode includes: A data bit in configuration information is used for indication, or a field in the configuration information is used for indication.

The repeated sending information of the message 3 includes a quantity of times of repeatedly sending the message 3, an indication for repeatedly sending the message 3, and a condition for repeatedly sending the message 3. A quantity K of times of repeatedly sending the message 3 may be at least one of 2, 4, 8, 16, and 32.

The sending the message 3 repeatedly may be indicated by using a data bit. The data bit is carried in the configuration information, and the data bit is used to indicate the quantity of times of repeatedly sending the message 3. A quantity of bits occupied by the data bit may be any one of 1 bit, 2 bits, 3 bits, or 4 bits. That the data bit indicates the quantity of times of repeatedly sending the message 3 is related to a bit range, which may be at least one of 1, 2, 3, 4, 5, 6, 7, 8, 9, 10, 11, 12, 13, 14, 15 and 16, occupied by data.

When the quantity of bits occupied by the data bit is 2 bits, the data bit indicates that a quantity of repetitions of the message 3 is 2, 4, 8, or 16. For example, when the data bit is 00, the quantity of repetitions of the message 3 is 2. When the data bit is 01, the quantity of repetitions of the message 3 is 4. When the data bit is 10, the quantity of repetitions of the message 3 is 8. When the data bit is 11, the quantity of repetitions of the message 3 is 16.

FIG. 6 is an indication method using a field in configuration information according to this application. The configuration information may be used to determine at least one of the following: a quantity M of random access preamble groups, a quantity $K_i$ of random access preambles in a random access preamble group, and a quantity $N_i$ of SSBs associated with one random access preamble group, where i is 0, 1, . . . , or M−1.

An association (also referred to as mapping, where both the terms "association" and "mapping" are used below, and have no difference in meaning) between an SSB and a random access preamble group may be as follows:

$N_0$ SSBs associated with a random access preamble group 0 are determined, and the $N_0$ SSBs are sequentially mapped to $K_0$ random access preambles in the random access preamble group 0.

$N_i$ SSBs associated with a random access preamble group i are determined, and the $N_i$ SSBs are sequentially mapped to $K_i$ random access preambles in the random access preamble group i.

This process ends until mapping between downlink signals and the M random access preamble groups is completed.

In an implementation, $N_i$=N. To be specific, a quantity of SSBs associated with each random access preamble group is the same (or a quantity of SSBs mapped to each random access preamble group is the same).

In an implementation, each random access preamble group is associated with a same SSB. For example, a downlink signal time index set associated with the random access preamble group i is {$SSB_0$, $SSB_1$, . . . , $SSB_{N-1}$}, where i=0, 1, . . . , or M−1.

In an implementation, $K_i$=K. To be specific, a quantity of random access preambles in each random access preamble group is the same. Further, it may be that $K_i$=R, where R is a quantity of random access preambles determined based on ssb-perRACH-OccasionAndCB-PreamblesPerSSB, and i=0, 1, . . . , or M−1.

In an implementation, the $K_i$ random access preambles in the random access preamble group i are $K_i$ consecutive random access preambles whose indexes start from $$\sum_{j=0}^{i-1}K_j,$$

where i=0, 1, . . . , or M−1.

In an implementation, $K_i$=R, and R random access preambles in the random access preamble group i are R consecutive random access preambles whose indexes start from i×R, where i=0, 1, . . . , or M−1.

In an implementation, indexes of random access preambles in the random access preamble group i are consecutive, and index numbers of the random access preambles are related to at least one of the following parameters: an index number i of a random access preamble, a quantity M of random access preamble groups, and a quantity of downlink signals associated with each random access preamble group.

In an implementation, $K_i$=R, and $N_i$=N. Each random access preamble group is associated with the same SSB, and random access preambles associated with a downlink signal whose index is n and is associated with the random access group are R consecutive random access preambles whose indexes start from $$n\times\frac{N_{preamble}^{total}}{NM}+i\times R,$$

where i=0, 1, . . . , or M−1, and $$N_{preamble}^{total}$$

is a quantity of random access preambles on a random access occasion.

In an implementation, $K_i$=R, and $N_i$=N. Each random access preamble group is associated with the same SSB, and random access preambles associated with a downlink signal whose index is n and is associated with the random access group are R consecutive random access preambles whose indexes start from $$n\times\frac{N_{preamble}^{total}}{N}+i\times R,$$

where i=0, 1, . . . , or M−1, and $$N_{preamble}^{total}$$

is a quantity of random access preambles on a random access occasion.

In an implementation, $K_i$=R, and $N_i$=N. Each random access preamble group is associated with the same SSB, and random access preambles associated with a downlink signal whose index is n and is associated with the random access group are R consecutive random access preambles whose indexes start from $$n \times \frac{N_{preamble}^{total}}{M} + i \times R,$$

where i=0, 1, . . . , or M−1, and $$N_{preamble}^{total}$$

is a quantity of random access preambles on a random access occasion.

Sending a message 3 repeatedly may be indicated by using one or more separate fields, and the fields indicate a random access preamble set or a random access preamble group. For example, when random access preambles are divided into three groups, three fields may be used for indication. A random access preamble group indicated by a third field is a random access preamble group indicating the sending the message 3 repeatedly or in a diversity mode. For example, when a terminal device needs to perform repeated sending, the random access preamble group indicated by the third field is selected for sending. A manner of the repeated sending by the terminal device is determined by a field value and a field length of the third field, as shown in FIG. 6.

1-bit information may be further added to configuration information, to determine whether there is a random access preamble that supports the sending the message 3 repeatedly or in a diversity mode. Alternatively, a message including a plurality of bits is used in the configuration information, and the message including a plurality of bits is used to indicate a quantity of times of repeatedly sending the message 3.

The random access preamble group indicates that a random access preamble in the group supports the quantity of times of repeatedly sending the message 3, and the quantity of times of repeatedly sending the message 3 may be K. The configuration information may alternatively reuse an existing field to indicate the sending the message 3 repeatedly. For example, an existing configured quantity numberOfRA-PreamblesGroupA of contention based random access preamble fields GroupA is used to indicate the sending the message 3 repeatedly.

When a base station uses a field in the configuration information to indicate the sending the message 3 repeatedly, 1 bit may be used to indicate a random access preamble set indicating the sending the message 3 repeatedly, or 2 bits are added to indicate whether a plurality of preamble sets used to indicate the sending the message 3 repeatedly exist, or indicate N, where N is a quantity of preamble sets indicating the sending the message 3 repeatedly.

For example, when N=2, two random access preamble groups exist. A first group indicates that the quantity of times of repeatedly sending the message 3 is two, and a second set indicates that the quantity of times of repeatedly sending the message 3 is four.

The configuration information includes an association relationship between a synchronization signal and a random access preamble and a random access occasion. The terminal device determines the random access preamble and the random access occasion based on the configuration information. In a conventional technology, only an association relationship between a contention based random access preamble and the synchronization signal is configured in the configuration information. All contention based random access preambles and random access occasions are associated with all SSBs in an association period. All SSBs are all SSBs in an SSB period. For example, if there are two random access occasions in the association period, there are two contention based random access preambles on each random access occasion, and there are four SSBs in total, each random access occasion needs to be associated with two SSBs, and each random access preamble needs to be associated with one SSB.

The configuration information provided in this application is used to indicate that when random access preambles are divided into N groups of random access preambles, each of the N groups of random access preambles and all random access occasions are associated with SSBs.

For example, when N is 2, there are two groups of contention based random access preambles in the association period, each group of contention based random access preambles includes two contention based random access preambles, the association period includes four SSBs, and the four SSBs include an SSB 0, an SSB 1, an SSB 2, and an SSB 3. There are two random access occasions in the association period, and each random access occasion needs to include two contention based random access preambles belonging to the first group and two contention based random access preambles belonging to the second set. An association relationship between a random access preamble and an SSB includes:

A $1^{st}$ random access preamble in a first group of random access preambles on a first random access occasion is associated with the SSB 0.

A $2^{nd}$ random access preamble in the first group of random access preambles on the first random access occasion is associated with the SSB 1.

A $1^{st}$ random access preamble in a first group of random access preambles on a second random access occasion is associated with the SSB 2.

A $2^{nd}$ random access preamble in the first group of random access preambles on the second random access occasion is associated with the SSB 3.

Correspondingly, an association between a second group of random access preambles and an SSB includes:

A $1^{st}$ random access preamble in a second group of random access preambles on the first random access occasion is associated with the SSB 0.

A $2^{nd}$ random access preamble in the second group of random access preambles on the first random access occasion is associated with the SSB 1.

A $1^{st}$ random access preamble in a second group of random access preambles on the second random access occasion is associated with the SSB 2.

A $2^{nd}$ random access preamble in the second group of random access preambles on the second random access occasion is associated with the SSB 3.

Each random access occasion is associated with two SSBs, and each random access preamble in each group is associated with one SSB.

That is, an association relationship between a preamble group and an SSB is independent. It may be an independent configuration or a common configuration. All random access occasions are configured to be associated with SSBs. Therefore, compared with that in the conventional technology, this solution improves random access efficiency. The independence described herein is that an association between a preamble group and an SSB is not related to an association of a random access preamble indicating the not sending the message 3 repeatedly. For example, an existing association method may be used for specific configuration information.

In some embodiments, that the configuration information indicates the sending the message 3 repeatedly or in a diversity mode may use an SSB index for notification. A notification manner is {SSB index, L1}, where L1 indicates the quantity of times of repeatedly sending the message 3. The sending the message 3 repeatedly may be sending repeatedly in a frequency hopping mode, or may be sending repeatedly in a non-frequency hopping mode. The base station and/or the terminal device may specify a frequency hopping frequency offset, or may specify a time interval for the repeated sending. The time interval may be a symbol interval in a slot, or may be a slot interval. Therefore, a frequency hopping offset and/or a time interval for the sending repeatedly or in a diversity mode may be configured in system information. Alternatively, any one or more of two parameters, namely, the frequency hopping offset and the time interval for the sending repeatedly or in a diversity mode, may be configured in an RAR. The time interval may be related to an uplink-downlink configuration. For example, the time interval is one slot, that is, the message 3 is transmitted once in each uplink slot. However, because the uplink-downlink configuration is 4:1, one message 3 is sent repeatedly or in a diversity mode in every five slots, and the time interval is five slots. The time interval in at least one embodiment is a difference between start slots of two times of transmission of the message 3.

Figure 10:
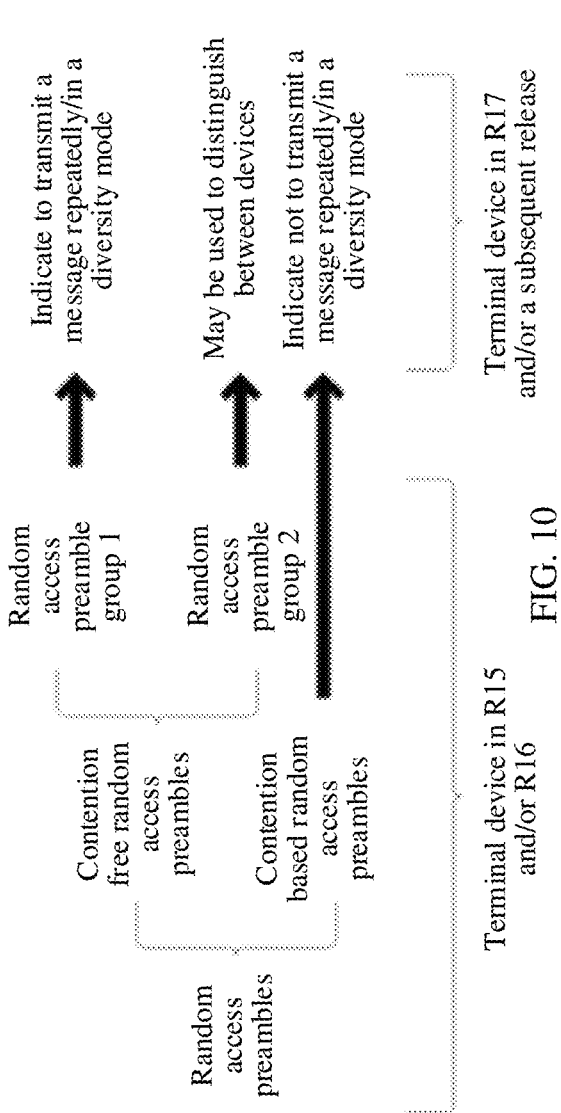
FIG. 10 is a schematic diagram of a method for grouping random access preambles according to an embodiment of this application.
Figure 11:
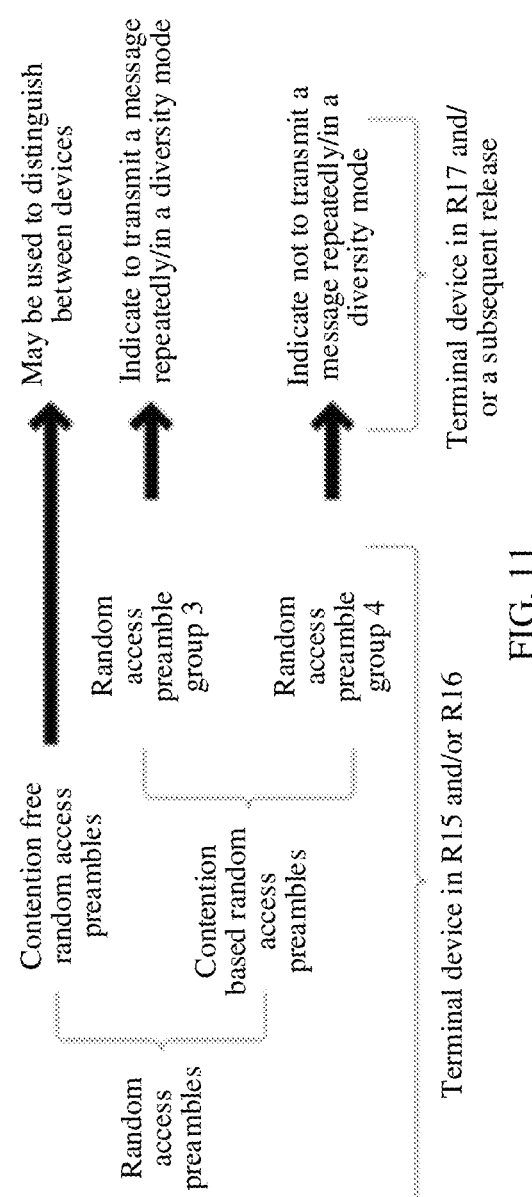
FIG. 11 is a schematic diagram of another method for grouping random access preambles according to an embodiment of this application.

Configuration information provided in this application is used to indicate that random access preambles are divided into N groups of random access preambles, with reference to a method for grouping random access preambles shown in FIG. 10 and FIG. 11.

In some embodiments, random access preambles are grouped, and one group represents that random access preambles are random access preamble indicating the repeated sending. The random access preambles indicating the repeated sending may be random access preambles indicating the repeated sending within K PRACH configuration periodicities, or may be random access preambles indicating the repeated sending within K SSB-PRACH association periodicities. To be specific, a plurality of random access preambles on a plurality of different random access occasions (or a plurality of random access preambles on a same random access occasion) form one message 1, and a terminal may send the plurality of random access preambles before a random access response is sent. Alternatively, the message 1 may include a plurality of random access preambles, the plurality of random access preambles are on different random access occasions or on a same random access occasion, a terminal sends the plurality of random access preambles based on the message 1, and a base station receives the plurality of random access preambles based on the message. Alternatively, a plurality of random access preambles are in one random access preamble group, and the plurality of random access preambles in the random access preamble group received by the base station are a plurality of random access preambles that can be sent by a same terminal device. Further, the plurality of random access preambles are responded through one or more random access response messages.

FIG. 8 and FIG. 9 are schematic diagrams of a relationship between a random access preamble group and random access time according to an embodiment of this application.

As shown in FIG. 8, a random access occasion 0 corresponds to a random access preamble group 0 and a random access preamble group 1, a random access occasion 1 corresponds to the random access preamble group 0 and the random access preamble group 1, a random access occasion 2 corresponds to the random access preamble group 0 and the random access preamble group 1, and a random access occasion 3 corresponds to the random access preamble group 0 and the random access preamble group 1.

Random access time 0 corresponds to the random access occasion 0 and the random access occasion 1.

The random access occasion 1 and a random access occasion 4 are associated with a same SSB index, and the random access occasion 0 and the random access occasion 4 are associated with a same SSB index.

As shown in FIG. 9, a random access preamble i and a random access preamble j belong to the random access preamble group 1. When selecting the random access preamble group 1, a terminal determines a plurality of random access preambles on at least one random access occasion (for example, i on the random access occasion 1 and j on the random access occasion 4) based on at least one piece of the following information: preset information or information indicated by a base station and quality of a downlink signal, and sends the plurality of random access preambles to the base station. The terminal may send the random access preamble i and the random access preamble j, to send a message 1 for a plurality of times.

The base station determines and detects the plurality of random access preambles on the at least one random access occasion (for example, i on the random access occasion 1 and j on the random access occasion 4) based on preset or configuration information. When detecting at least one of the random access preamble i on the random access occasion 1 and the random access preamble j on the random access occasion 4, the base station sends a random access response to the terminal device. A random access response message may further indicate a manner of transmitting a message 3, including at least one of a quantity of repetitions and a diversity-based sending.

Random access occasions of random access preambles sent in two adjacent times may be associated with a same SSB index, and may be located at different positions of a time domain resource and/or a frequency domain resource. In this embodiment, the repeated sending may be sending for a plurality of times. For a random access preamble set indicating the repeated sending, sending the message 3 repeatedly or in a diversity mode is supported by default. A quantity of times of repeatedly sending the message 3 may be specified in a protocol or may be configured in system information. A random access preamble indicating the repeated sending may have a same RAR response and a same message 3. A value of K may be 1, or a value of K ranges from 1 to 8. Alternatively, time for repeatedly transmitting the message 1 may be restricted to not exceed Y ms. For example, Y is 160 ms or 320 ms. When the message 1 is repeatedly transmitted, the terminal device may use a plurality of messages 2 to schedule positions of time-frequency resources of same messages 3 to repeatedly transmit the message 3. Alternatively, a network device may use a same message 2 to indicate a random access preamble associated with same messages 3 for a plurality of times, and schedule a plurality of positions of time frequency resources for the messages 3 associated with the random access preamble, to repeatedly send the message 3.

It may be understood that, for a random access preamble that supports the sending the message 3 repeatedly or in a diversity mode by default, grouping may be further performed, and a grouping result is associated with a manner of sending the message 3. That a grouping result is associated with a manner of sending the message 3 includes: Random access preambles that support the sending the message 3 repeatedly or transmitting the message 3 in a diversity mode by default are further divided into several groups, where each group corresponds to a specific sending manner. The sending manner includes: repeated sending with different quantities of times for the repeated sending, different diversity-based sending manners, frequency hopping sending with different frequencies, and the like.

S402: The terminal device receives the configuration information and the downlink signal, and selects a random access preamble for sending, including:

When the terminal device initiates a random access process, the terminal device selects, as information 1, one of random access preamble sequences that can be selected by a current cell, and sends the random access preamble on an uplink PARCH channel.

A process in which the terminal device selects the random access preamble includes:

The terminal device selects and determines, based on whether the sending the message 3 repeatedly or in a diversity mode is supported, the random access preamble to be sent. When the terminal device supports the sending the message 3 repeatedly or in a diversity mode, the terminal device may select a random access preamble, namely, a first random access preamble, indicating the sending the message 3 repeatedly or in a diversity mode, or may select a random access preamble that does not indicate the sending the message 3 repeatedly or in a diversity mode. Alternatively, when the terminal device does not support the sending the message 3 repeatedly or in a diversity mode, the terminal device selects a random access preamble indicating that the sending the message 3 repeatedly or in a diversity mode does not need to be performed.

Further, for a terminal device in R17 and/or a subsequent release, the terminal device in R17 and/or a subsequent release supports the sending the message 3 repeatedly or in a diversity mode, and may select the random access preamble indicating the sending the message 3 repeatedly or in a diversity mode, or may select the random access preamble that does not indicate the sending the message 3 repeatedly or in a diversity mode.

In some embodiments, the terminal device may determine, based on a path loss calculated by the terminal device, whether to select a random access preamble of a specific group. For example, when the path loss is large, the random access preamble indicating the sending the message 3 repeatedly or in a diversity mode may be selected. When the path loss is small, the random access preamble that does not indicate the sending the message 3 repeatedly or in a diversity mode may be selected. The path loss may be obtained through calculation by using parameters such as a transmit power of the base station, channel attenuation, and a receive power of the terminal device.

FIG. 7 is a schematic diagram of a relationship between a threshold for a downlink signal and whether to perform repeated sending according to an embodiment of this application.

In some embodiments, as shown in FIG. 7, when a threshold for receiving a downlink signal by a terminal device is less than a specific value, the terminal device selects a random access preamble indicating the sending a message 3 repeatedly or in a diversity mode. Further, when the threshold for the downlink signal is within a range 1, a random access preamble indicating that the message 3 is repeatedly sent for N1 times is selected. When the threshold for the downlink signal is within a range 2, a random access preamble indicating that the message 3 is repeatedly sent for N2 times is selected. When the threshold for the downlink signal is greater than the specific value, a random access preamble that does not indicate the sending the message 3 repeatedly is selected.

In some embodiments, any one of random access preamble groups may correspond to a manner of the sending the message 3 repeatedly based on an association relationship between the downlink signals and random access preambles. With reference to the relationship between the threshold for the downlink signal and whether to perform repeated sending shown in FIG. 7, when the threshold for the downlink signal is between a threshold 1 and a threshold 2, and the terminal device needs to repeatedly send the message 3 for N1 times, the terminal device selects the random access preamble indicating that the message 3 is repeatedly sent for N1 times. Other cases shown in FIG. 7 correspond to the foregoing descriptions, and details are not described again.

In some embodiments, a terminal device in R17 and/or a subsequent release may determine, based on another parameter, to select the random access preamble indicating the sending the message 3 repeatedly or in a diversity mode or a random access preamble that does not indicate the sending the message 3 repeatedly or in a diversity mode. Further, the terminal device in R17 and/or a subsequent release may determine, based on another parameter, to select a manner of sending the message 3, and select a corresponding random access preamble based on the manner of sending the message 3.

S403: The base station receives the random access preamble, and sends a message 2.

After receiving a first random access preamble, the base station may learn, based on a group to which the first random access preamble belongs, whether the terminal device needs to send the message 3 repeatedly or in a diversity mode. It may be understood that random access preambles may be classified into only a random access preamble group indicating the repeated sending and a random access preamble group not indicating the repeated sending. In this grouping case, the base station needs to indicate a specific manner of the sending the message 3 repeatedly or in a diversity mode.

A message used by the base station to indicate, to the terminal device, the sending the message 3 repeatedly or in a diversity mode specifically includes:

In some embodiments, that configuration information indicates the sending the message 3 repeatedly or in a diversity mode may be indicated by using information in an RAR.

In an indication manner, some data bits of a time advance command (TAC) are used for indication. For a terminal device in R15 and/or R16, indication cannot be performed. To be specific, the foregoing random access preamble indicating that the sending repeatedly or in a diversity mode is not performed is selected, and these values are set to 0. If a random access preamble indicating that the sending repeatedly or in a diversity mode is performed is selected, some data indicates information related to the sending repeatedly or in a diversity mode. The information related to the repeated sending includes at least one piece of information of a quantity of times of the repeated sending, a frequency offset between different quantities of times for the repeated sending, and a time interval between the different quantities of times for the repeated sending.

In some embodiments, to indicate the sending the message 3 repeatedly, in an indication manner, a header (a Sub Header) corresponding to the RAR is separately used to indicate the information related to the repeated sending. Specifically, the header corresponding to the RAR may be bound to a random access preamble. Alternatively, an identifier of a header may be redefined, and all related information is placed in an RAR corresponding to the header.

In some embodiments, the terminal device in R15 and/or R16 may select a random access preamble that supports the sending the message 3 repeatedly or in a diversity mode. In this case, the terminal device in R15 and/or R16 cannot identify an indication that is sent by the base station and that indicates the sending the message 3 repeatedly or in a diversity mode, and does not send the message 3 repeatedly or in a diversity mode.

S404: The terminal device receives the message 2, and sends the message 3 based on a manner indicated by the configuration information, the downlink signal, and an SSB signal.

In some embodiments, the terminal device receives the configuration information, and repeatedly sends the message 3 based on a data bit carried in the configuration information. For example, when a quantity of bits occupied by the data bit carried in the configuration information is 2 bits, and the data bit is 00, the terminal device repeatedly sends the message 3, and a quantity of times of repeatedly sending the message 3 is two. Alternatively, when the quantity of bits occupied by the data bit carried in the configuration information is 2 bits, and the data bit is 11, the terminal device repeatedly sends the message 3, and the quantity of times of repeatedly sending the message 3 is eight.

In some embodiments, the terminal device receives the configuration information, and determines, based on a field carried in the configuration information, to repeatedly send the message 3, and determines the quantity of times of repeatedly sending the message 3.

In some embodiments, the configuration information may be carried in the message 2, including: being carried in some data bits in a TAC or in a redefined identifier of a header.

The terminal device may determine, based on at least one of the message 2 and the configuration information, the downlink signal, and the SSB signal, a sending manner of sending the message 3. Alternatively, the terminal device may determine, based on at least one of the configuration information, the downlink signal, and the SSB signal, the manner of sending the message 3.

After receiving an indication, the terminal device sends the message 3 in an agreed manner based on content agreed by the indication. Correspondingly, the base station receives, in an agreed manner based on the agreed content, the message 3 sent by the terminal device.

After random access preambles are grouped, the terminal device selects, based on whether the terminal device supports the sending the message 3 repeatedly or in a diversity mode, a random access preamble of a corresponding group for sending. After receiving the random access preamble sent by the terminal device, the base station determines, based on the random access preamble sent by the terminal device, whether to indicate the terminal device to send the message 3 repeatedly or in a diversity mode. If the terminal device supports the sending the message 3 repeatedly or in a diversity mode, the terminal device sends the message 3 repeatedly or in a diversity mode at a corresponding position. Alternatively, if the terminal device does not support the sending the message 3 repeatedly or in a diversity mode, the terminal device does not send the message 3 repeatedly or in a diversity mode.

Further, when the terminal device does not support the sending the message 3 repeatedly or in a diversity mode, that is, the terminal device is the terminal device in R15 and/or R16, a random access preamble that does not support the sending the message 3 repeatedly and/or transmitting the message 3 in a diversity mode is selected.

FIG. 10 is a schematic diagram of a method for grouping random access preambles according to an embodiment of this application.

As shown in FIG. 10, in a method for classifying random access preambles by a base station, contention free random access preambles determined by a terminal device in R15 and/or R16 may be classified into two groups. A first group is a random access preamble group 1, and a second group is a random access preamble group 2.

For the terminal device in R15 and/or R16, both random access preambles in the random access preamble group 1 and/or the random access preamble group 2 are contention free random access preambles. The terminal device in R15 and/or R16 sends contention free random access preambles, namely, random access preambles in the random access preamble group 2 and the random access preamble group 1, to the base station in a case of contention free random access.

In some embodiments, for the terminal device in R15 and/or R16, in a process of initiating the contention free random access, the terminal device selects a random access preamble from the random access preamble group 2.

For a terminal device in R17 and/or a subsequent release, random access preambles in the random access preamble group 1 are contention based random access preambles, indicating that the terminal device supports the sending a message repeatedly or in a diversity mode. For the terminal device in R17 and/or a subsequent release, random access preambles in the random access preamble group 2 are contention free random access preambles.

For the contention based random access preambles determined by the terminal device in R15 and/or R16, after receiving a random access preamble that belongs to the "contention based random access preambles determined by the terminal device in R15 and/or R16", the base station does not indicate the terminal device to send a message repeatedly or in a diversity mode, and does not reserve a time domain resource and/or a frequency domain resource for the terminal device to send the message repeatedly or in a diversity mode.

For the terminal device in R17 and/or a subsequent release, it is considered that the "contention based random access preambles determined by the terminal device in R15 and/or R16" are contention based random access preambles. After receiving a random access preamble that belongs to the "contention based random access preambles determined by the terminal device in R15 and/or R16", the base station does not indicate the terminal device to send a message repeatedly or in a diversity mode, and does not reserve a time domain resource and/or a frequency domain resource for the terminal device to send the message repeatedly or in a diversity mode.

For the terminal device in R15 and/or R16, there are two groups of random access preambles provided by the base station or agreed in a communication protocol. Random access preambles in one group, namely, the random access preamble group 1 and the random access preamble group 2, are contention free random access preambles, and random access preambles in the other group are contention based random access preambles. In addition, for the terminal device in R17 and/or a subsequent release, the base station provides three types of random access preambles. Random access preambles in two groups, namely, the random access preamble group 1 and the "contention based random access preamble determined by the terminal device in R15 and/or R16", are contention based random access preambles, and random access preambles in one group, namely, the random access preamble group 2, are contention free random access preambles.

In some embodiments, for the terminal device in R15 and/or R16, there are two groups of random access preambles provided by the base station or agreed on in the communication protocol. Random access preambles in one group, namely, the random access preamble group 2, are contention free random access preambles, and random access preambles in the other group are the "contention based random access preambles determined by the terminal device in R15 and/or R16". In this embodiment, it can be avoided that the terminal device in R15 and/or R16 selects a random access preamble that belongs to the random access preamble group 1 but cannot identify an indication of the base station, and therefore resources of the base station are not wasted.

When the base station indicates the terminal device to send a message repeatedly or in a diversity mode, the base station reserves a time domain resource and/or a frequency domain resource for the terminal device to send the message repeatedly or in a diversity mode. When the base station does not indicate the terminal device to send a message repeatedly or in a diversity mode, the base station does not reserve a time domain resource and/or a frequency domain resource for the terminal device to send the message repeatedly or in a diversity mode.

In some embodiments, contention free random access preambles determined by the terminal device in R15 and/or R16 may be divided into a plurality of groups, at least one of the groups is selected as the random access preamble group 1, and the remaining groups are used as the random access preamble group 2.

FIG. 11 is a schematic diagram of another method for grouping random access preambles according to an embodiment of this application.

In the method for grouping random access preambles, as shown in FIG. 11, contention based random access preambles determined by a terminal device in R15 and/or R16 may be divided into two groups. A first group is a random access preamble group 3, and a second group is a random access preamble group 4.

For a terminal device in R17 and/or a subsequent release, a random access preamble in the random access preamble group 3 indicates that the terminal device supports the sending a message repeatedly or in a diversity mode. When a base station receives a random access preamble in the random access preamble group 3 sent by the terminal device, the base station indicates the terminal device to send a message repeatedly or in a diversity mode.

For the terminal device in R17 and/or a subsequent release, after selecting a random access preamble in the random access preamble group 4, the terminal device in R17 and/or a subsequent release does not send a message repeatedly or in a diversity mode. For the terminal device in R17 and/or a subsequent release, after receiving the random access preamble in the random access preamble group 4, the base station does not indicate the terminal device to send the message repeatedly or in a diversity mode.

For the terminal device in R15 and/or R16, random access preambles in both the random access preamble group 3 and/or the random access preamble group 4 are contention based random access preambles. Because the terminal device randomly selects a contention based random access preamble sent by the terminal device, the base station cannot identify, from the random access preamble, whether the terminal device that sends the random access preamble is the terminal device in R17 and/or a subsequent release or the terminal device in R15 and/or R16. For the terminal device in R17 and/or a subsequent release, the random access preamble in the random access preamble group 3 indicates that the terminal device needs to send a message 3 repeatedly or in a diversity mode, and the random access preamble in the random access preamble group 4 indicates that the terminal device does not need to send the message 3 repeatedly or in a diversity mode.

When receiving a random access preamble that belongs to the random access preamble group 3, the base station indicates the terminal device to send a message repeatedly or in a diversity mode. When receiving a random access preamble that belongs to the random access preamble group 4, the base station does not indicate the terminal device to send a message repeatedly or in a diversity mode.

The terminal device in R15 and/or R16 sends a contention free random access preamble to the base station in a case of contention free random access.

For the terminal device in R17 and/or a subsequent release, it is considered that "contention free random access preambles determined by the terminal device in R15 and/or R16" are contention free random access preambles. In the case of contention free random access, the terminal device in R17 and/or a subsequent release sends the "contention free random access preambles determined by the terminal device in R15 and/or R16" to the base station.

For the terminal device in R15 and/or R16, there are two groups of random access preambles provided by the base station. Random access preambles in one group are contention free random access preambles, and random access preambles in the other group, namely, the random access preamble group 4 and the random access preamble group 3, are contention based random access preambles. For the terminal device in R17 and/or a subsequent release, there are three groups of random access preambles provided by the base station in total. Random access preambles in two groups, namely, the random access preamble group 3 and the random access preamble group 4, are contention based random access preambles, and random access preambles in one group are contention free random access preambles.

In some embodiments, for the terminal device in R15 and/or R16, there are two groups of random access preambles provided by the base station. Random access preambles in one group are contention free random access preambles, and random access preambles in the other group, namely, the random access preamble group 4, are contention based random access preambles. In this embodiment, it can be avoided that the terminal device in R15 and/or R16 selects a random access preamble in the random access preamble group 3 but cannot identify an indication of the base station, and therefore resources of the base station are not wasted.

In some embodiments, the contention based random access preambles determined by the terminal device in R15 and/or R16 may be divided into a plurality of groups, at least one of the groups is selected as the random access preamble group 3, and the remaining groups are used as the random access preamble group 4.

In a specific embodiment of this application, in the methods for grouping random access preambles shown in FIG. 10 and FIG. 11, the grouping method includes: randomly selecting at least one random access preamble for grouping, fixedly selecting at least one random access preamble for grouping, and grouping random access preambles in odd-even order.

When the base station indicates the terminal device to send a message repeatedly or in a diversity mode, the base station reserves a time domain resource and/or a frequency domain resource for the terminal device to send the message repeatedly or in a diversity mode. When the base station does not indicate the terminal device to send a message repeatedly or in a diversity mode, the base station does not reserve a time domain resource and/or a frequency domain resource for the terminal device to send the message repeatedly or in a diversity mode.

The foregoing "the base station indicates the terminal device to send a message repeatedly or in a diversity mode" includes: The base station performs indication through system information.

Before transmitting data through a network, the terminal device needs to access the network through the base station. The terminal device needs to obtain frequency and/or time synchronization in a downlink direction of the base station through cell search (Cell Search), to detect a cell identity (Cell ID). During the cell search, the terminal device obtains a PSS and an SSS of a cell, and receives and demodulates a PBCH to obtain the system information. The PSS, the SSS, and the PBCH constitute an SSB. The base station periodically sends the SSB in the downlink direction. The system information includes a master information block (MIB). 24-bit information from a higher layer indicates a system frame number, a subcarrier spacing of the SSB, and the like. In addition, there is 8-bit information from a physical layer. For the 8-bit information from the physical layer, 3-bit information may indicate a synchronization block index (SSB Index).

A synchronization signal block may be used to include information indicating the terminal device to send a message repeatedly or in a diversity mode. An including manner is {SSB index, K}, where K represents a quantity of times of and/or a manner of sending the message repeatedly or in a diversity mode. For example, the terminal device repeatedly sends a message. In this case, K identifies the quantity of times of repeatedly sending the message. When the terminal device performs diversity-based sending, K identifies a manner of sending the message in a diversity mode. The message may be sent in a manner of frequency hopping, or may be sent without frequency hopping. A network device may specify a frequency hopping frequency offset, or may specify a repetition time interval. The time interval may be a symbol interval in a slot, or may be a slot interval. Therefore, a frequency hopping offset and/or the repetition time interval may be configured in the system information.

In some embodiments, the base station may alternatively configure any one or more of two parameters: the frequency hopping offset and the repetition time interval in an RAR. In a specific embodiment of this application, the time interval in this application is a difference between start slots of two times of transmission of the message.

In some embodiments, a time interval at which the terminal device is indicated to perform sending may be related to an uplink-downlink configuration.

The foregoing "the base station indicates the terminal device to send a message repeatedly or in a diversity mode" includes: The base station performs indication through information in the RAR.

FIG. 12 is a schematic diagram of configuration information included in time alignment according to an embodiment of this application.

As shown in FIG. 12, on a network side, a base station continuously detects a PRACH channel received signal, and after receiving a random access preamble, the base station determines an optimal beam received by a terminal device. After receiving the random access preamble, the base station sends a corresponding RAR through a PDCCH and/or a physical downlink shared channel (PDSCH). The RAR includes a time alignment value (a Timing Advance Command, TAC) of uplink transmission.

After sending the random access preamble, the terminal device starts a random access response receive window (ra-Response Window), monitors the PDCCH channel, and detects DCI. After the DCI is successfully detected, the terminal device obtains information included in the RAR. System information may indicate a quantity of useful data bits of the TAC, or indicate a data bit of information related to sending a message 3 repeatedly or in a diversity mode, and a range of values configured for different data bits. For example, the system information indicates that a data bit of a quantity of repetitions starts from k1, and a quantity of occupied data bits is k2, for example, k1=8 and k2=2. In this case, it may indicate that the quantity of repetitions is 1, 2, 3, or 4. Alternatively, a quantity of data bits of related information and a related value may be directly specified in a protocol.

Specification in the Protocol

In some embodiments, the base station may alternatively perform indication through information about a header in the RAR. In some embodiments, a new identifier 1 of a header may be defined in a random access response, and information related to the sending repeatedly or in a diversity mode is placed in a random access response corresponding to the identifier 1 of the header.

Figure 13:
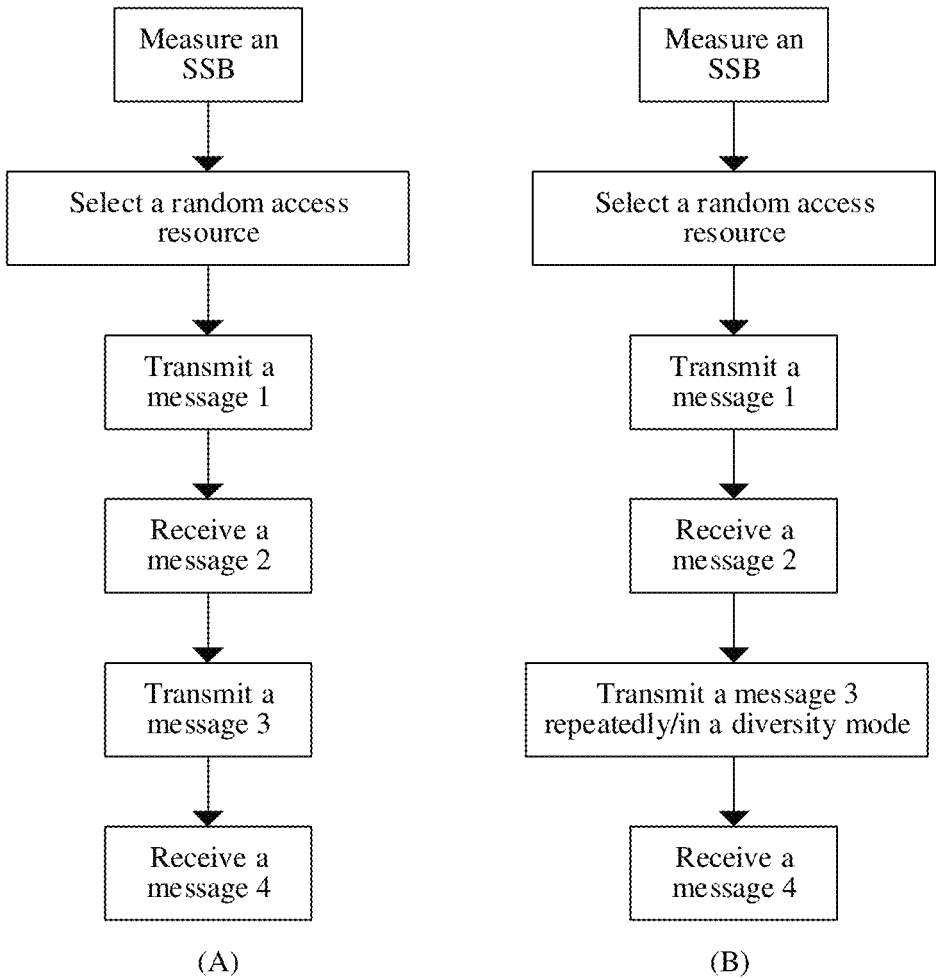
FIG. 13 is a schematic diagram of architectures of terminal device sides in a random access method according to an embodiment of this application.

FIG. 13 is a schematic diagram of architectures of terminal device sides in a random access method according to this application.

(A) in FIG. 13 shows a system architecture on a terminal device side, including: A terminal device measures an SSB, selects a random access resource (including selecting a random access preamble), sends a message 1, receives a message 2, sends a message 3, and receives a message 4.

When the message 3 does not need to be sent repeatedly or in a diversity mode, a random access method of the system architecture on the terminal side is shown in (A) in FIG. 13. For the method for grouping random access preambles shown in FIG. 11, that is a case in which "contention free random access preambles determined by a terminal device in R15 and/or R16 may be divided into two groups, where a first group is a random access preamble group 1, and a second group is a random access preamble group 2". When contention based random access is initiated for the terminal device in R15 and/or R16, and a random access resource is selected, a random access preamble is selected from "contention based random access preambles determined by the terminal device in R15 and/or R16". When the terminal device is a terminal device in R17 and/or a subsequent release, and a random access resource is selected, a random access preamble is selected from the "contention free random access preambles determined by the terminal device in R15 and/or R16".

In this case, a base station receives a random access preamble that belongs to the "contention based random access preambles determined by the terminal device in R15 and/or R16". Regardless of whether a terminal device is the terminal device in R17 and/or a subsequent release or the terminal device in R15 and/or R16, the base station does not indicate the terminal device to send the message 3 repeatedly or in a diversity mode, and does not reserve a resource for sending the message 3 repeatedly or in a diversity mode.

(B) in FIG. 13 shows a system architecture on a terminal side, including: A terminal device measures an SSB, selects a random access resource (including selecting a random access preamble), sends a message 1, receives a message 2, sends a message 3 repeatedly or in a diversity mode, and receives a message 4.

When the message 3 needs to be sent repeatedly or in a diversity mode, a random access method of the system architecture on the terminal side is shown in FIG. 10(B). For the method for grouping random access preambles shown in FIG. 11, that is a case in which "contention free random access preambles determined by a terminal device in R15 and/or R16 may be divided into two groups, where a first group is a random access preamble group 1, and a second group is a random access preamble group 2". When contention based random access is initiated for the terminal device in R15 and/or R16, and a random access resource is selected, a random access preamble is selected from "contention based random access preambles determined by the terminal device in R15 and/or R16". However, when a terminal device is a terminal device in R17 and/or a subsequent release, and a random access resource is selected, a random access preamble is selected from the "random access preamble group 1".

In this case, a base station receives a random access preamble that is sent by the terminal device and that belongs to the "contention based random access preambles determined by the terminal device in R15 and/or R16", and does not indicate the terminal device to send the message 3 repeatedly or in a diversity mode. If the base station receives a random access preamble that belongs to the "random access preamble group 1", the base station indicates the terminal device to send the message 3 repeatedly or in a diversity mode, and reserves a resource for sending the message 3 repeatedly or in a diversity mode.

For the method for grouping random access preambles shown in FIG. 11, that is a case in which the "contention based random access preambles determined by the terminal device in R15 and/or R16 may be divided into two groups, where a first group is a random access preamble group 3, and a second group is a random access preamble group 4".

When the terminal device does not need to send the message 3 repeatedly or in a diversity mode, a random access method of the system architecture on the terminal side is shown in FIG. 10(A). When the contention based random access is initiated for the terminal device in R15 and/or R16, and a random access resource is selected, a random access preamble is selected from the "random access preamble group 4". When the terminal device is a terminal device in R17 and/or a subsequent release, and a random access resource is selected, a random access preamble is selected from the "random access preamble group 4".

When the base station receives a random access preamble that is sent by the terminal device and that belongs to the "random access preamble group 4", the base station does not indicate the terminal device to send the message 3 repeatedly or in a diversity mode, and does not reserve a resource for the sending the message 3 repeatedly or in a diversity mode.

When the terminal device does not need to send the message 3 repeatedly or in a diversity mode, a random access method of the system architecture on the terminal side is shown in (B) in FIG. 13.

When the contention based random access is initiated for the terminal device in R15 and/or R16, and a random access resource is selected, a random access preamble is selected from the "random access preamble group 4". When the terminal device is a terminal device in R17 and/or a subsequent release, and a random access resource is selected, a random access preamble is selected from the "random access preamble group 3".

When the base station receives a random access preamble that is sent by the terminal device and that belongs to the "random access preamble group 3", the base station indicates the terminal device to send the message 3 repeatedly or in a diversity mode, and reserves a resource for the sending the message 3 repeatedly or in a diversity mode.

In some embodiments, when the terminal device needs to send the message 3 repeatedly or in a diversity mode, the terminal device in R15 and/or R16 initiates the contention based random access, and a random access resource is selected, a random access preamble may be further selected from the "random access preamble group 3". In this case, when the base station indicates the terminal device to send the message 3 repeatedly or in a diversity mode, the terminal device in R17 and/or a subsequent release can obtain an indication of the base station to send the message 3 repeatedly or in a diversity mode, and the terminal device in R15 and/or R16 cannot identify the indication of the base station, and therefore cannot send the message 3 repeatedly or in a diversity mode.

Figure 14:
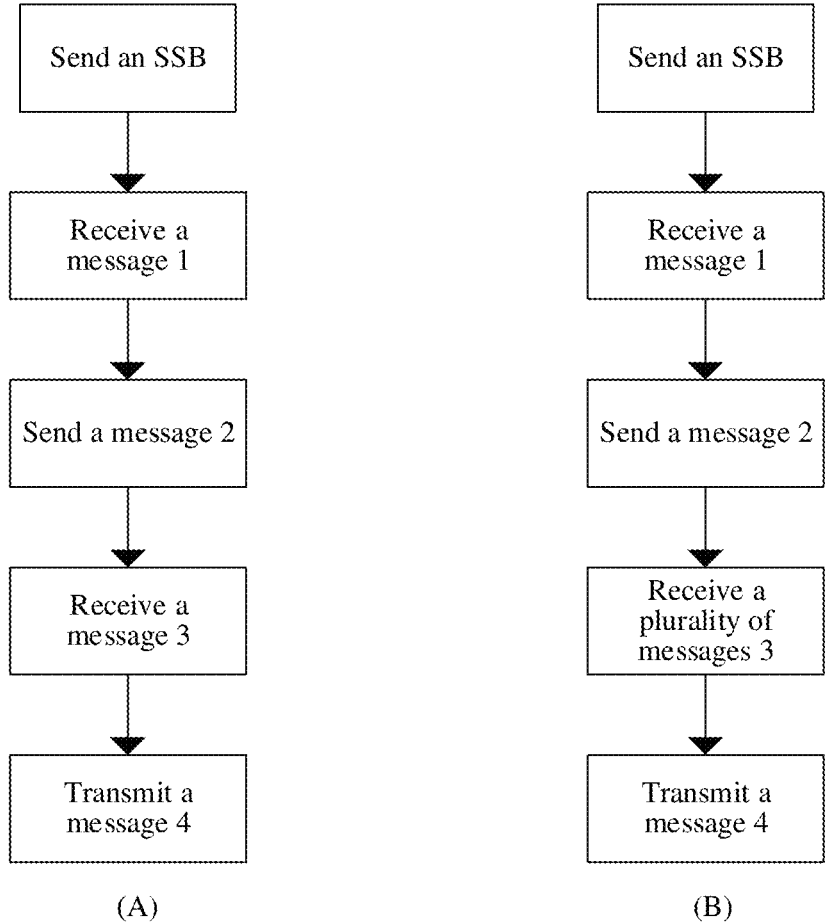
FIG. 14 is a schematic diagram of architectures of base station sides in a random access method according to an embodiment of this application.

FIG. 14 is a schematic diagram of architectures of base station sides in a random access method according to this application.

(A) in FIG. 14 shows a random access method of a system architecture on a base station side, including: A base station sends an SSB, receives a message 1, sends a message 2, receives a message 3, and sends a message 4. When a terminal device does not need to send the message 3 repeatedly or in a diversity mode, a random access method of the system architecture on the base station side is shown in (A) in FIG. 14. For the method for grouping random access preambles shown in FIG. 11, the base station receives a random access preamble that belongs to "contention-based random access preambles determined by a terminal device in R15 and/or R16". Regardless of whether the terminal device is a terminal device in R17 and/or a subsequent release or the terminal device in R15 and/or R16, the base station does not indicate the terminal device to send the message 3 repeatedly or in a diversity mode, and does not reserve a resource for sending the message 3 repeatedly or in a diversity mode.

(B) in FIG. 14 shows a random access method of a system architecture on a base station side, including: A base station sends an SSB, receives a message 1, sends a message 2, receives a plurality of messages 3, and sends a message 4. When a message 3 needs to be sent repeatedly or in a diversity mode, a random access method of the system architecture on the base station side is shown in (B) in FIG. 14. For the method for grouping random access preambles shown in FIG. 11, the base station receives a random access preamble that belongs to a "random access preamble group 1", learns that the terminal device is the terminal device in R17 and/or a subsequent release, indicates the terminal device in R17 and/or a subsequent release to send the message 3 repeatedly or in a diversity mode, reserves a resource for the terminal device in R17 and/or a subsequent release to send the message 3 repeatedly or in a diversity mode, and receives, in a corresponding time domain window and/or a corresponding frequency domain window, a plurality of messages 3 sent by the terminal device in R17 and/or a subsequent release.

For the method for grouping random access preambles shown in FIG. 11, when the terminal device does not need to send the message 3 repeatedly or in a diversity mode, a random access method of the system architecture on the base station side is shown in (A) in FIG. 14.

The base station receives a random access preamble that belongs to a "random access preamble group 4". Regardless of whether the terminal device is the terminal device in R17 and/or a subsequent release or the terminal device in R15 and/or R16, the base station does not indicate the terminal device to send the message 3 repeatedly or in a diversity mode, and does not reserve a resource for sending the message 3 repeatedly or in a diversity mode.

When the terminal device needs to send the message 3 repeatedly or in a diversity mode, a random access method of the system architecture on the base station side is shown in (B) in FIG. 14.

The base station receives a random access preamble that belongs to a "random access preamble group 3", learns that the terminal device is the terminal device in R17 and/or a subsequent release, indicates the terminal device in R17 and/or a subsequent release to send the message 3 repeatedly or in a diversity mode, reserves a resource for the terminal device in R17 and/or a subsequent release to send the message 3 repeatedly or in a diversity mode, and receives, in a corresponding time domain window and/or a corresponding frequency domain window, a plurality of messages 3 sent by the terminal device in R17 and/or a subsequent release.

In some embodiments, when the terminal device needs to send the message 3 repeatedly or in a diversity mode, the terminal device in R15 and/or R16 initiates contention based random access, and a random access resource is selected, a random access preamble may be further selected from the "random access preamble group 3". In this case, the base station receives a random access preamble that belongs to the "random access preamble group 3", indicates the terminal device to send the message 3 and/or transmit the message 3 in a diversity mode, reserves a resource for the terminal device to send the message 3 repeatedly or in a diversity mode, and receives, in a corresponding time domain window and/or a corresponding frequency domain window, a plurality of messages 3 sent by the terminal device.

In conclusion, the foregoing embodiments are merely intended for describing the technical solutions of this application, but not for limiting this application. Although this application is described in detail with reference to the foregoing embodiments, a person of ordinary skill in the art should understand that the technical solutions described in the foregoing embodiments may still be modified, or some technical features in the technical solutions may be equivalently replaced. These modifications or replacements do not make the essence of the corresponding technical solutions fall outside the scope of the technical solutions of embodiments of this application.

According to the context, the term "when" used in the foregoing embodiments may be interpreted as a meaning of if, "after", "in response to determining", or "in response to detecting".

The foregoing descriptions are merely specific implementations of this application, but are not intended to limit the protection scope of the this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A random access method, wherein the method comprises:
   sending, by a base station, a first downlink signal, random access configuration information, and association information to a terminal device, wherein
      the random access configuration information indicates a correspondence between a first random access preamble group and a manner of sending message 3, and
      the association information indicates an association between each random access preamble in the first random access preamble group and at least one downlink signal;
   receiving, by the base station, a first random access preamble from the terminal device, wherein the first random access preamble belongs to the first random access preamble group and corresponds to the first downlink signal;
   sending, by the base station, a random access response; and
   receiving, by the base station, a message 3 from the terminal device in the manner corresponding to the first random access preamble group.

2. The method according to claim 1, wherein the manner of sending the message 3 comprises at least one of:
   sending the message 3 in a repetition mode,
   sending the message 3 in a frequency hopping mode, or
   sending the message 3 in a diversity mode.

3. The method according to claim 1, wherein
   the random access configuration information is used to determine at least one of:
      a quantity of repetitions for repeatedly sending the message 3, or
      a value of a receiving threshold of a downlink signal.

4. The method according to claim 3, wherein before receiving the first random access preamble, the method further comprises:
   determining the first random access preamble group based on a power of the first downlink signal and the receiving threshold of the downlink signal.

5. The method according to claim 4, wherein
   in response to the power of the first downlink signal being less than the receiving threshold of the downlink signal, determining the first random access preamble group with the manner of sending the message 3 is repeatedly sending the message 3.

6. The method according to claim 1, wherein
   the random access response indicates a quantity of repetitions for repeatedly sending the message 3.

7. The method according to claim 3, wherein
   the quantity of repetitions for repeatedly sending the message 3 is one selected from the group consisting of 1, 2, 3, 4, 7, 8, 12, and 16.

8. A random access method, wherein the method comprises:
   receiving, by a terminal device, a first downlink signal, random access configuration information, and association information, wherein
      the random access configuration information indicates a correspondence between a first random access preamble group and a manner of sending message 3, and
      the association information indicates an association between each random access preamble in the first random access preamble group and at least one downlink signal;

sending, by the terminal device, a first random access preamble, wherein the first random access preamble belongs to the first random access preamble group and corresponds to the first downlink signal;

receiving, by the terminal device, a random access response; and sending, by the terminal device, a message 3 in the manner corresponding to the first random access preamble group.

9. The method according to claim 8, wherein the manner of sending the message 3 comprises at least one of:

sending the message 3 in a repetition mode, sending the message 3 in a frequency hopping mode, or sending the message 3 in a diversity mode.

10. The method according to claim 8, wherein the method further comprises:

determining, by the terminal device using the random access configuration information, at least one of:

a quantity of repetitions for repeatedly sending the message 3, or a value of a receiving threshold of a downlink signal.

11. The method according to claim 10, wherein before the sending the first random access preamble, the method further comprises:

determining, by the terminal device, the first random access preamble group based on a power of the first downlink signal and the receiving threshold of the downlink signal.

12. The method according to claim 11, wherein the method further comprises:

determining, by the terminal device in response to the power of the first downlink signal being less than the receiving threshold of the downlink signal, the first random access preamble group with the manner of sending the message 3 is repeatedly sending the message 3.

13. The method according to claim 8, wherein the random access response indicates a quantity of repetitions for repeatedly sending the message 3.

14. The method according to claim 10, wherein the quantity of repetitions for repeatedly sending the message 3 is one selected from the group consisting of 1, 2, 3, 4, 7, 8, 12, and 16.

15. A communication device, comprising:

a receiver, configured to receive a first downlink signal, random access configuration information, and association information, wherein the random access configuration information indicates a correspondence between a first random access preamble group and a manner of sending message 3, and the association information indicates an association between each random access preamble in the first random access preamble group and at least one downlink signal; and a transmitter, configured to send a first random access preamble, wherein the first random access preamble belongs to the first random access preamble group and corresponds to the first downlink signal;

wherein the receiver is further configured to receive a random access response; and the transmitter is further configured to send a message 3 in the manner corresponding to the first random access preamble group.

16. The communication device according to claim 15, wherein the manner of sending the message 3 comprises at least one of:

sending the message 3 in a repetition mode, sending the message 3 in a frequency hopping mode, or sending the message 3 in a diversity mode.

17. The communication device according to claim 15, further comprising:

a processor configured to use the random access configuration information to determine at least one of:

a quantity of repetitions for repeatedly sending the message 3, or a value of a receiving threshold of a downlink signal.

18. The communication device according to claim 17, wherein the processor is further configured to determine the first random access preamble group based on a power of the first downlink signal and the receiving threshold of the downlink signal.

19. The communication device according to claim 18, wherein the processor is further configured to determine, in response to the power of the first downlink signal being less than the receiving threshold of the downlink signal, the first random access preamble group with the manner of sending the message 3 is repeatedly sending the message 3.

20. The communication device according to claim 15, wherein the random access response indicates a quantity of repetitions for repeatedly sending the message 3.

\* \* \* \* \*